(12) United States Patent
Stuart et al.

(10) Patent No.: US 12,354,295 B2
(45) Date of Patent: Jul. 8, 2025

(54) EYE TRACKING LATENCY ENHANCEMENTS

(71) Applicant: Magic Leap, Inc., Plantation, FL (US)

(72) Inventors: Bradley Vincent Stuart, Fort Lauderdale, FL (US); Daniel Farmer, Verdi, NV (US); Tiejian Zhang, Santa Clara, CA (US); Shiuli Das, Milpitas, CA (US); Suraj Manjunath Shanbhag, Santa Clara, CA (US); Erik Fonseka, Biel (CH)

(73) Assignee: MAGIC LEAP, INC., Plantation, FL (US)

( * ) Notice: Subject to any disclaimer, the term of this patent is extended or adjusted under 35 U.S.C. 154(b) by 706 days.

(21) Appl. No.: 17/597,026

(22) PCT Filed: Jul. 1, 2020

(86) PCT No.: PCT/US2020/040549
§ 371 (c)(1),
(2) Date: Dec. 22, 2021

(87) PCT Pub. No.: WO2021/007087
PCT Pub. Date: Jan. 14, 2021

(65) Prior Publication Data
US 2022/0301217 A1    Sep. 22, 2022

Related U.S. Application Data

(60) Provisional application No. 62/945,562, filed on Dec. 9, 2019, provisional application No. 62/871,009, filed on Jul. 5, 2019.

(51) Int. Cl.
*G06T 7/70*    (2017.01)
*G06T 7/11*    (2017.01)
(Continued)

(52) U.S. Cl.
CPC .................. *G06T 7/70* (2017.01); *G06T 7/11* (2017.01); *G06T 7/13* (2017.01); *G06T 7/60* (2013.01);
(Continued)

(58) Field of Classification Search
CPC combination set(s) only.
See application file for complete search history.

(56) References Cited

U.S. PATENT DOCUMENTS 6,850,221 B1    2/2005    Tickle
8,929,589 B2    1/2015    Publicover et al.
(Continued)

FOREIGN PATENT DOCUMENTS

JP    2012055428 A    3/2012
JP    2014532542 A    12/2014
(Continued)

OTHER PUBLICATIONS

Barsingerhorn et al., "Development and validation of high-speed stereoscopic eyetracker," *Behavior Research Methods* 50:2480-2497, Mar. 5, 2018. (18 pages).
(Continued)

*Primary Examiner* — Zhiyu Lu
(74) *Attorney, Agent, or Firm* — Seed IP Law Group LLP

(57) ABSTRACT

Systems and methods for eye tracking latency enhancements. An example head-mounted system obtains a first image of an eye of a user. The first image is provided as input to a machine learning model which has been trained to generate iris and pupil segmentation data given an image of an eye. A second image of the eye is obtained. A set of locations in the second image at which one or more glints are shown is detected based on iris segmentation data generated for the first image. A region of the second image at which the pupil of the eye of the user is shown is identified based on
(Continued)

pupil segmentation data generated for the first image. A pose of the eye of the user is determined based on the detected set of glint locations in the second image and the identified region of the second image.

15 Claims, 13 Drawing Sheets

(51) Int. Cl.
| | |
|---|---|
| *G06T 7/13* | (2017.01) |
| *G06T 7/60* | (2017.01) |
| *G06V 10/22* | (2022.01) |
| *G06V 10/766* | (2022.01) |
| *G06V 40/18* | (2022.01) |

(52) U.S. Cl.
CPC ............ *G06V 10/22* (2022.01); *G06V 10/766* (2022.01); *G06V 40/193* (2022.01); *G06V 40/197* (2022.01); *G06T 2207/10052* (2013.01); *G06T 2207/20081* (2013.01); *G06T 2207/20084* (2013.01); *G06T 2207/30201* (2013.01)

(56) References Cited

U.S. PATENT DOCUMENTS

| | | | |
|---|---|---|---|
| 9,600,069 B2 | 3/2017 | Publicover et al. | |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0147408 A1 | 5/2016 | Bevis et al. | |
| 2017/0091996 A1 | 3/2017 | Wel et al. | |
| 2017/0109936 A1 | 4/2017 | Powderly et al. | |
| 2018/0053056 A1* | 2/2018 | Rabinovich | G06V 10/764 |
| 2019/0073533 A1 | 3/2019 | Chen et al. | |
| 2019/0076014 A1 | 3/2019 | Ryan et al. | |
| 2019/0076015 A1 | 3/2019 | Johansson et al. | |

FOREIGN PATENT DOCUMENTS

| | | |
|---|---|---|
| JP | 2017526078 A | 9/2017 |
| JP | 2017536618 A | 12/2017 |
| WO | WO 2013067230 A1 | 5/2013 |
| WO | WO 2018000020 A1 | 1/2018 |
| WO | WO 2019045750 A1 | 3/2019 |
| WO | WO 2021/007087 | 1/2021 |

OTHER PUBLICATIONS

International Search Report and Written Opinion for PCT Application No. PCT/US2020/040549, mailed Sep. 10, 2020.
Arsalan, et al., "Deep Learning-Based Iris Segmentation for Iris Recognition in Visible Light Environment," Symmetry, Nov. 4, 2017.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Fuhl, et al., "Pupil detection for head-mounted eye tracking in the wild: an evaluation of the state of the art," Machine Vision and Applications, Jun. 7, 2016.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

EYE TRACKING LATENCY ENHANCEMENTS

INCORPORATION BY REFERENCE

This application incorporates by reference the entirety of each of the following patent applications: U.S. Provisional Patent Application Ser. No. 62/871,009, filed on Jul. 5, 2019; and U.S. Provisional Patent Application Ser. No. 62/945,562, filed on Dec. 9, 2019.

BACKGROUND

The present disclosure relates generally to systems and methods for processing eye imagery and more particularly for estimating a detailed eye shape model, comprising the pupil, iris, or eyelid using cascaded shape regression. The human iris of an eye can be used as a source of biometric information. Biometric information can provide authentication or identification of an individual. Biometric information can additionally or alternatively be used to determine a gaze direction for the eye.

SUMMARY

Systems and methods for robust biometric applications using a detailed eye shape model are described. In one aspect, after receiving an eye image of an eye (e.g., from an eye-tracking camera on an augmented reality display device), an eye shape (e.g., a shape of an upper or lower eyelid, an iris, or a pupil) of the eye in the eye image is calculated using cascaded shape regression methods. Eye features related to the estimated eye shape can then be determined and used in biometric applications, such as gaze estimation or biometric identification or authentication (e.g., iris codes). The cascaded shape regression method can be trained on a set of annotated eye images that label, for example, the shape of the eyelids, pupil, and iris.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1A:
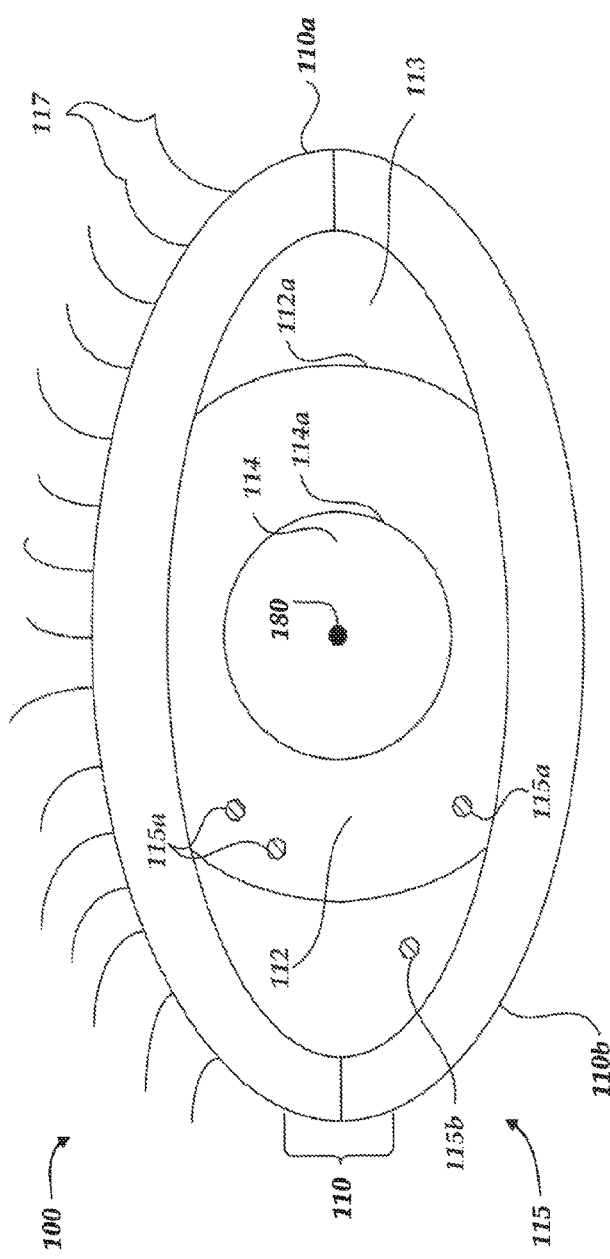
FIG. 1A schematically illustrates an example of an eye showing example eye features.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Extracting biometric information from the eye generally includes a procedure for the segmentation of the iris within an eye image. Iris segmentation can involve operations including locating the iris boundaries, finding the pupillary and limbic boundaries of the iris, localizing upper or lower eyelids if they occlude the iris, detecting and excluding occlusions of eyelashes, shadows, or reflections, and so forth. For example, the eye image can be included in an image of the face or may be an image of the periocular region. To perform iris segmentation, both the boundary of the pupil (e.g., the interior boundary of the iris) and the limbus (e.g., the exterior boundary of the iris) can be identified as separate segments of image data. In addition to this segmentation of the iris, the portion of the iris that is occluded by the eyelids (upper or lower) can be estimated. This estimation is performed because, during normal human activity, the entire iris of a person is rarely visible. For example, the entire iris may not generally be free from occlusions of the eyelids (e.g., during blinking).

Eyelids may be used by the eye to keep the eye moist, for example, by spreading tears and other secretions across the eye surface. Eyelids may also be used to protect the eye from foreign debris. As an example, the blink reflex protects the eye from acute trauma. As another example, even when the eye is actively viewing the world, the eyelids may protect the eye, for example, by moving automatically in response to changes in the pointing direction of the eye. Such movement by the eyelids can maximize protection of the eye surface while avoiding occlusion of the pupil. However, this movement presents further challenges when extracting biometric information with iris-based biometric measurements such as iris segmentation. For example, to use iris segmentation, the areas of the iris that are occluded by the eyelids may be estimated and masked from identity verification computations or images taken during eyelid blink may be discarded or given lower weight during analysis.

Extracting biometric information has presented challenges, such as estimating the portion of the iris occluded by eyelids. However, using the techniques described herein, the challenges presented in extracting biometric information can be mitigated. For example, the challenges may at least in part be mitigated by first estimating the eye shape. As used herein, the eye shape includes one or more of a shape (e.g., a boundary) of the pupil, iris, upper eyelid, or lower eyelid. This estimation of eye shape may be used as a starting point for iris segmentation in some embodiments.

Once the eye shape is estimated, biometric applications may be performed more efficiently and more robustly. For example, corneal reflections (e.g., glints) found in certain regions of the eye (e.g., the iris) may be used for gaze estimation. Glints in other regions of the eye (e.g., the sclera) may, in some embodiments, not be used in eye gaze estimation. By calculating a detailed eye shape model using the techniques described herein, glints in the desired regions (e.g., iris) can be located more quickly and efficiently by removing the need to search the entire eye (e.g., iris and sclera), thus producing a more efficient and robust gaze estimation.

To obtain biometric information, algorithms exist for tracking eye movements of a user of a computer. For example, a camera coupled to a monitor of the computer can provide images for identifying eye movements. However, the cameras used for eye tracking are some distance from the eyes of the user. For example, the camera may be placed at the top of a user's monitor coupled to the computer. As a result, the images of the eyes produced by the camera are, often, produced with poor resolution and at differing angles. Accordingly, extracting biometric information from a captured eye image may present challenges.

In the context of a wearable head mounted display (HMD), cameras may advantageously be closer to a user's eyes than a camera coupled to the user's monitor. For example, cameras may be mounted on the wearable HMD, which itself is placed on a user's head. The proximity of the eyes to such a camera can result in higher resolution eye imagery. Accordingly, it is possible for computer vision techniques to extract visual features from the user's eyes, particularly at the iris (e.g., an iris feature) or in the sclera surrounding the iris (e.g., a scleral feature). For example, when viewed by a camera near the eye, the iris of an eye will show detailed structures. Such iris features may be particularly pronounced when observed under infrared (IR) illumination and can be used for biometric applications, such as gaze estimation or biometric identification. These iris features are unique from user to user and, in the manner of a fingerprint, can be used to identify the user uniquely. Eye features can include blood vessels in the sclera of the eye (outside the iris), which may also appear particularly pronounced when viewed under red or infrared light. Eye features may further include glints and the center of the pupil.

With the techniques disclosed herein, detailed eye shape estimation may be used to produce a more robust technique for detecting eye features used in biometric applications (e.g., gaze estimation and biometric identification). The use of gaze estimation has significant implications on the future of computer interfaces. Gaze estimation is currently employed in active interfaces (e.g., an interface that receives instructions through eye movements) and passive interfaces (e.g., a virtual reality device that modifies the display based on gaze position). Detecting eye features using conventional eye shape estimation techniques is challenging because of image noise, ambient light, and large variations in appearance when the eye is half-closed or blinking. Therefore, a technique for producing a more robust algorithm for determining eye features used in biometric applications, such as gaze estimation or biometric identification, would be advantageous. The following disclosure describes such a method.

The present disclosure will describe a detailed eye shape model calculated using cascaded shape regression techniques, as well as ways that the detailed eye shape model may be used for robust biometric applications. Recently, shape regression has become the state-of-the-art approach for accurate and efficient shape alignment. It has been successfully used in face, hand and ear shape estimation. Regression techniques are advantageous because, for example, they are capable of capturing large variances in appearance; they enforce shape constraint between landmarks (e.g., iris between eyelids, pupil inside iris); and they are computationally efficient. While regression techniques are described, it may be appreciated that neural networks may be employed as an alternative to and/or in combination with regression techniques. For example, non-linear combinations of regressions may be utilized and fall within the scope of the disclosure herein.

As used herein, video may include, but is not limited to, a recording of a sequence of visual images. Each image in a video is sometimes referred to as an image frame or a frame. A video can include a plurality of sequential frames or non-sequential frames, either with or without an audio channel. A video can include a plurality of frames, which are ordered in time or which are not ordered in time. Accordingly, an image in a video can be referred to as an eye image frame or eye image.

Example of an Eye Image

FIG. 1A illustrates an image of an eye 100 with eyelids 110, iris 112, and pupil 114. Curve 114a shows the pupillary boundary between the pupil 114 and the iris 112, and curve 112a shows the limbic boundary between the iris 112 and the sclera 113 (the "white" of the eye). The eyelids 110 include an upper eyelid 110a and a lower eyelid 110b and eyelashes 117. The eye 100 is illustrated in a natural resting pose. For example, the resting pose may represent a pose in which the user's face and gaze are both oriented as they would be toward a distant object ahead of the user. The natural resting pose of the eye 100 can be indicated by a natural resting direction 180, which can be a direction orthogonal to the surface of the eye 100 when in the natural resting pose (e.g., directly out of the plane for the eye 100 shown in FIG. 1A) and in this example, centered within the pupil 114.

The eye 100 can include eye features 115 in the iris or the sclera (or both) that can be used for biometric applications, such as eye tracking. FIG. 1A illustrates an example of eye features 115 including iris features 115a and a scleral feature 115b. Eye features 115 can be referred to as individual keypoints. Such eye features 115 may be unique to an individual's eye, and may be distinct for each eye of that individual. An iris feature 115a can be a point of a particular color density, as compared to the rest of the iris color, or as compared to a certain area surrounding that point. As another example, a texture (e.g., a texture that is different from texture of the iris nearby the feature) or a pattern of the iris can be identified as an iris feature 115a. As yet another example, an iris feature 115a can be a scar that differs in appearance from the iris 112.

Eye features 115 can also be associated with the blood vessels of the eye. For example, a blood vessel may exist outside of the iris 112 but within the sclera 113. Such blood vessels may be more prominently visible under red or infrared light illumination. The scleral feature 115b can be a blood vessel in the sclera of the eye.

Additionally or alternatively, eye features 115 may comprise glints, which comprise corneal reflections of light sources (e.g., an IR light source directed toward the eye for gaze tracking or biometric identification). In some cases, the term eye feature may be used to refer to any type of identifying feature in or on the eye, whether the feature is in the iris 112, the sclera 113, or a feature seen through the pupil 114 (e.g., on the retina).

Each eye feature 115 can be associated with a descriptor, which may be a numerical representation of an area surrounding the eye feature 115. A descriptor can also be referred to as an iris feature representation. As yet another example, such eye features may be derived from scale-invariant feature transforms (SIFT), speeded up robust features (SURF), features from accelerated segment test (FAST), oriented FAST and rotated BRIEF (ORB), KAZE, Accelerated KAZE (AKAZE), etc.

Accordingly, eye features 115 may be derived from algorithms and techniques from the field of computer vision known. Such eye features 115 can be referred to as keypoints. In some of the example embodiments described below, the eye features will be described in terms of iris features. This is not a limitation and any type of eye feature (e.g., a scleral feature) can be used, additionally or alternatively, in other implementations.

Figure 1B:
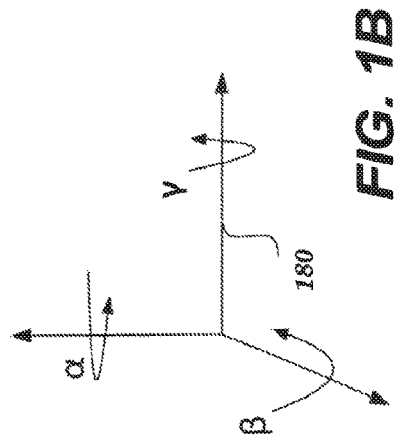
FIG. 1B shows an example of three angles (e.g., yaw, pitch, and roll) that can be used for measuring eye pose direction relative to a natural, resting state of the eye.

As the eye 100 moves to look toward different objects, the eye gaze (sometimes also referred to herein as eye pose) will change relative to the natural resting direction 180. The current eye gaze can be measured with reference the natural resting eye gaze direction 180. The current gaze of the eye 100 may be expressed as three angular parameters indicating the current eye pose direction relative to the natural resting direction 180 of the eye. For purposes of illustration, and with reference to an example coordinate system shown in FIG. 1B, these angular parameters can be represented as α (may be referred to as yaw), β (may be referred to as pitch), and γ (may be referred to as roll). In other implementations, other techniques or angular representations for measuring eye gaze can be used, for example, any other type of Euler angle system.

An eye image can be obtained from a video using any appropriate process. For example, an image may be extracted from one or more sequential frames. The pose of the eye can be determined from the eye image using a variety of eye-tracking techniques. For example, an eye pose can be determined by considering the lensing effects of the cornea on light sources that are provided or by calculating a shape of the pupil or iris (relative to a circular shape representing a forward-looking eye).

Example of a Wearable Display System Using Eye Shape Estimation

In some embodiments, display systems can be wearable, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 2A:
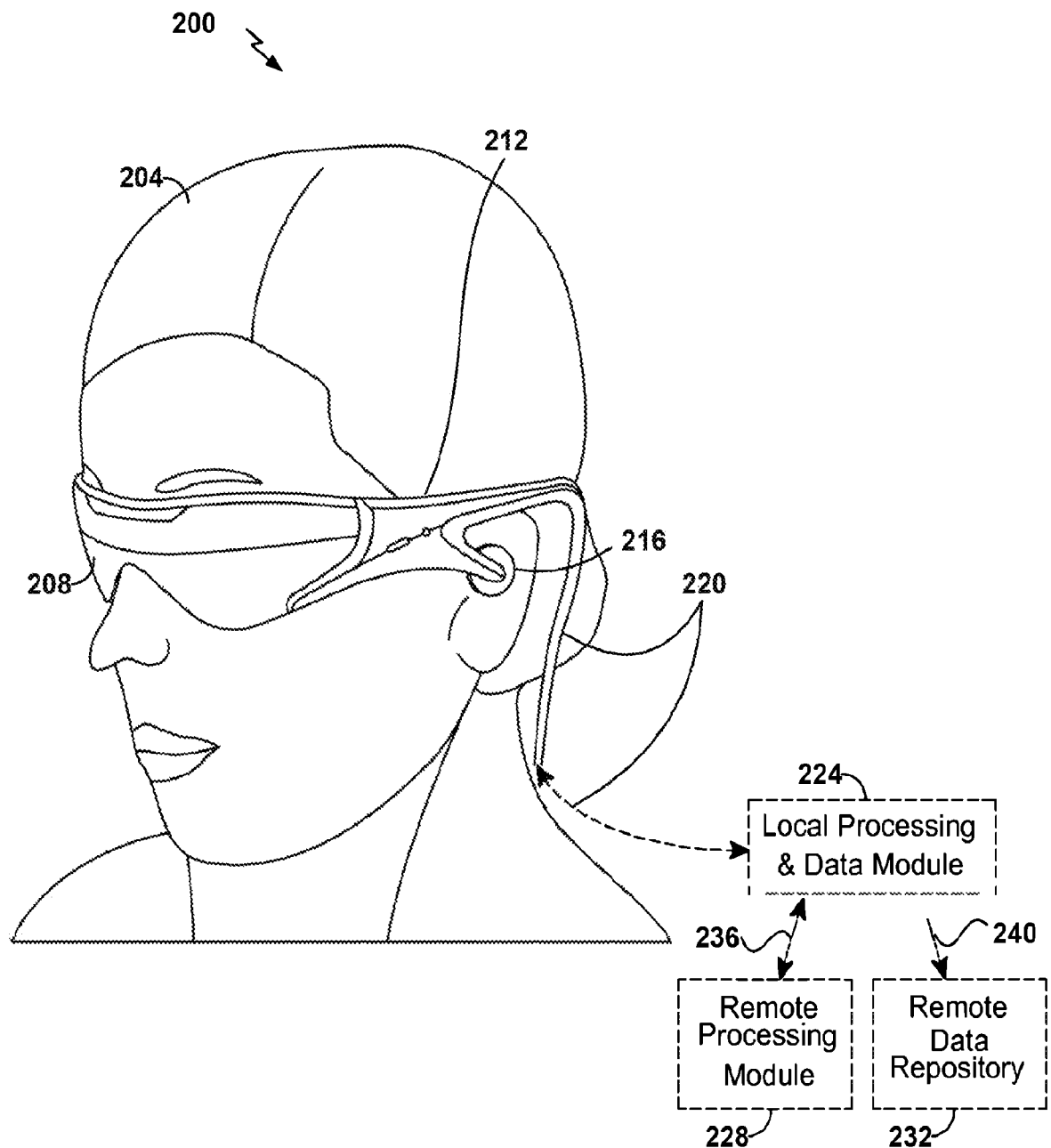
FIG. 2A schematically illustrates an example of a wearable display system.
Figure 2B:
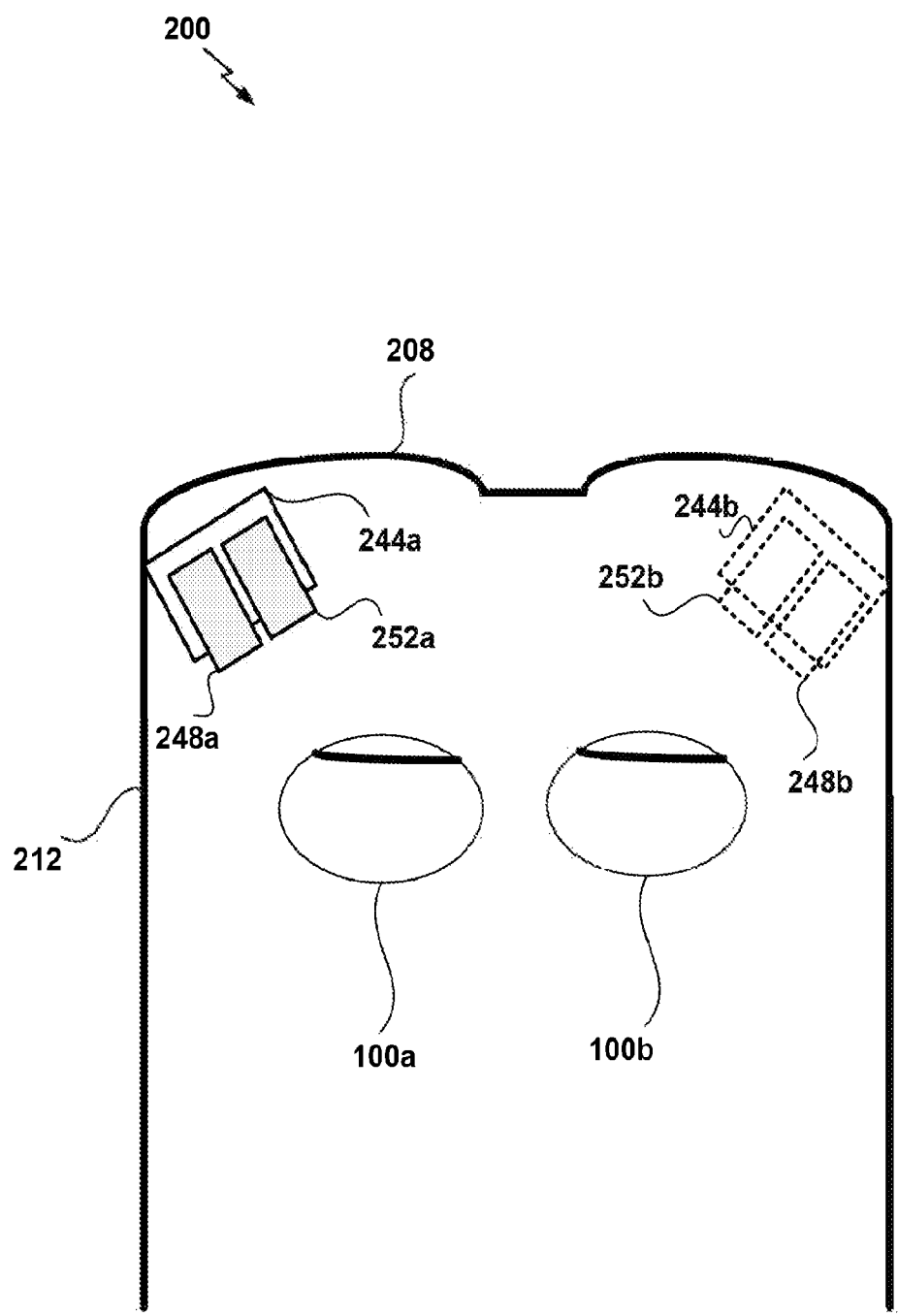
FIG. 2B schematically illustrates a top view of an example of the wearable display system.

FIGS. 2A and 2B illustrate examples of a wearable display system 200 that can be used to present a VR, AR, or MR experience to the wearer 204. The wearable display system 200 may be programmed to capture an image of an eye and perform eye shape estimation to provide any of the applications or embodiments described herein. The display system 200 includes a display 208 (e.g., positionable in front of the user's eye or eyes), and various mechanical and electronic modules and systems to support the functioning of that display 208. The display 208 may be coupled to a frame 212, which is wearable by a display system wearer or viewer 204 and which is configured to position the display 208 in front of the eyes of the wearer 204. The display 208 may be a light field display, configured to display virtual images at multiple depth planes from the user. In some embodiments, a speaker 216 is coupled to the frame 212 and positioned adjacent the ear canal of the user in some embodiments, another speaker, not shown, is positioned adjacent the other ear canal of the user to provide for stereo/shapeable sound control. The display 208 is operatively coupled 220, such as by a wired lead or wireless connectivity, to a local data processing module 224 which may be mounted in a variety of configurations, such as fixedly attached to the frame 212, fixedly attached to a helmet or hat worn by the user, embedded in headphones, or otherwise removably attached to the user 204 (e.g., in a backpack-style configuration, in a belt-coupling style configuration).

As shown in FIG. 2B, the wearable display system 200 may further include an eye tracking camera 252a disposed within the wearable display system 200 and configured to capture images of an eye 100a. The display system 200 may further comprise a light source 248a configured to provide sufficient illumination to capture eye features 115 of the eye 100a with the eye tracking camera 252a. In some embodiments, the light source 248a illuminates the eye 100a using infrared light, which is not visible to the user, so that the user is not distracted by the light source. The eye tracking camera 252a and light source 248a may be separate components that are individually attached to the wearable display system 200. For example, the components may be attached to the frame 212. In other embodiments, the eye tracking camera 252a and light source 248a may be components of a single housing 244a that is attached to the frame 212. In some embodiments, the wearable display system 200 may further comprise a second eye tracking camera 252b and a second light source 248b configured to illuminate and capture images of eye 100b. The eye tracking cameras 252a, 252b can be used to capture the eye images used in eye shape calculation, gaze determination, and biometric identification.

Referring again to FIG. 2A, the local processing and data module 224 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 212 or otherwise attached to the wearer 204), such as image capture devices (such as cameras), microphones, inertial measurement units, accelerometers, compasses, GPS units, radio devices, and/or gyros; and/or (b) acquired and/or processed using remote processing module 228 and/or remote data repository 232, possibly for passage to the display 208 after such processing or retrieval. The local processing and data module 224 may be operatively coupled by communication links 236, 240, such as via a wired or wireless communication links, to the remote processing module 228 and remote data repository 232 such that these remote modules 228, 232 are operatively coupled to each other and available as resources to the local processing and data module 224.

In some embodiments, the remote processing module 228 may comprise one or more processors configured to analyze and process data and/or image information such as video information captured by an image capture device. The video data may be stored locally in the local processing and data module 224 and/or in the remote data repository 232. In some embodiments, the remote data repository 232 may comprise a digital data storage facility, which may be available through the internet or other networking configuration in a "cloud" resource configuration. In some embodiments, all data is stored and all computations are performed in the local processing and data module 224, allowing fully autonomous use from a remote module. In some implementations, the local processing and data module 224 and/or the remote processing module 228 are programmed to perform embodiments of estimating a detailed eye shape model as described herein. For example, the local processing and data module 224 or the remote processing module 228 can be programmed to perform embodiments of routine 300 described with reference to FIG. 3 below. The local processing and data module 224 or the remote processing module 228 can be programmed to use eye shape estimation techniques disclosed herein to perform biometric applications, for example to identify or authenticate the identity of the wearer 204. Additionally or alternatively, in gaze estimation or pose determination, for example to determine a direction toward which each eye is looking.

An image capture device can capture video for a particular application (e.g., video of the wearer's eye for an eye-tracking application or video of a wearer's hand or finger for a gesture identification application). The video can be analyzed using the eye shape estimation techniques by one or both of the processing modules 224, 228. With this analysis, processing modules 224, 228 can perform eye shape estimation for robust biometric applications. As an example, the local processing and data module 224 and/or the remote processing module 228 can be programmed to store obtained eye images from the eye tracking cameras 252a, 252b attached to the frame 212. In addition, the local processing and data module 224 and/or the remote processing module 228 can be programmed to process the eye images using the eye shape estimation techniques described herein (e.g., the routine 300) to extract biometric information of the wearer 204 of the wearable display system 200. In some cases, off-loading at least some of the biometric information to a remote processing module (e.g., in the "cloud") may improve efficiency or speed of the computations. Various parameters for eye gaze identification (e.g., weights, bias terms, random subset sampling factors, number, and size of filters (e.g., Sobel derivative operator), etc.) can be stored in data modules 224 or 228.

The results of the video analysis (e.g., detailed eye shape model) can be used by one or both of the processing modules 224, 228 for additional operations or processing. For example, in various applications, biometric identification, eye-tracking, recognition, or classification of objects, poses, etc. may be used by the wearable display system 200. For example, video of the wearer's eye(s) can be used for eye shape estimation, which, in turn, can be used by the processing modules 224, 228 to determine the direction of the gaze of the wearer 204 through the display 208. The processing modules 224, 228 of the wearable display system 200 can be programmed with one or more embodiments of eye shape estimation to perform any of the video or image processing applications described herein.

Example Eye Shape Estimation Routine

Figure 3:
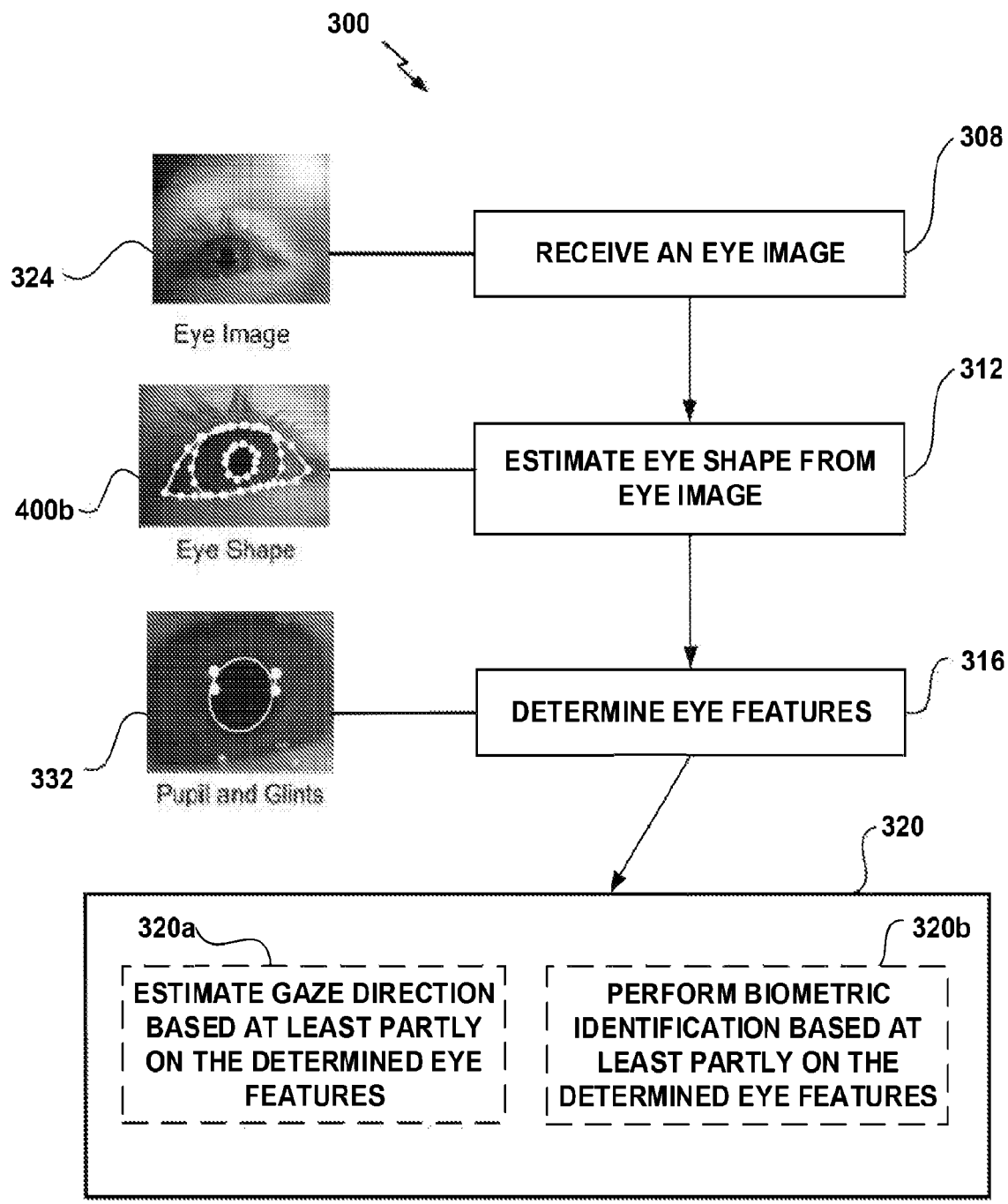
FIG. 3 is a flow diagram of an example routine for extracting biometric information from an eye image to be used in biometric applications.

FIG. 3 is a flow diagram of an example eye shape estimation routine 300. The eye shape estimation routine 300 can be implemented by the local processing and data module 224 or the remote processing module 228 and data repository 232 described with reference to FIG. 2. Eye shape estimation can also be referred to as eye shape detection or detailed eye shape modelling.

The routine 300 begins at block 308 when an eye image 324 is received. The eye image 324 can be received from a variety of sources including, for example, an image capture device, a head mounted display system, a server, a non-transitory computer-readable medium, or a client computing device (e.g., a smartphone). The eye image 324 may optionally be received from the eye tracking camera 252a. In some implementations, the eye image 324 can be extracted from a video (e.g., a video of the eye).

At block 312, a detailed eye shape model 400b may be estimated from the eye image 324. In some embodiments, the detailed eye shape model 400b may be estimated using cascaded shape regression as further described below.

At block 316, eye features 115 are determined based at least in part on the detailed eye shape model 400b estimated in block 312. In some embodiments, eye features 115 (some of which are shown in image 332) include pupillary or limbic boundaries, eyelid boundaries, glints, eye keypoints, or a center of the pupil 114. Eye features 115 may further include any feature that can be used in a biometric application. The detailed eye shape model 400b estimated in block 312 may serve as prior knowledge to improve the robustness of the feature detection at block 316.

At block 320, a biometric application (e.g., gaze estimation or biometric identification/authentication) is performed based at least in part on the biometric information obtained at blocks 312 and 316. In some embodiments, at block 320a, gaze direction may be estimated based at least in part on the eye features 115 determined at block 316. Additionally or alternatively, in some embodiments, at block 320b, biometric identification/authentication may be performed based at least in part on the eye features determined at block 316. Biometric identification or authentication may comprise determining an iris code based at least in part on the eye image and the determined pupillary and limbic boundaries (e.g., the iris code based on the Daugman algorithm).

Example Eye Shape Estimation

Given an input image I, with an initial eye shape $S_0$, cascaded shape regression progressively refines a shape S by estimating a shape increment ΔS stage-by-stage. The initial shape $S_0$ may represent a best guess to the eye shape (e.g., pupillary, limbic, and eyelid boundaries) or a default shape (e.g., circular pupillary and iris boundaries centered at the center of the eye image I). In a generic form, a shape increment $\Delta S_t$ at stage t is regressed as:

$$\Delta S_t = f_t(\Phi_t(I, S_{t-1}))\quad\quad\text{Eq. (1)}$$

where $f_t$ is a regression function at stage t and $\Phi_t$ is a shape-indexed extraction function. Note that $\Phi_t$ can depend on both the input image I and shape in the previous stage $S_{t-1}$. The shape-indexed extraction function $\Phi_t$ can handle larger shape variations compared to a "non-shape-indexed" feature. A pairwise pixel comparison feature may be used, which may be invariant to global illumination changes. The regression goes to the next stage t+1 by adding the shape increment $\Delta S_t$ to the shape in the previous stage $S_{t-1}$ to yield $S_{t-1}+\Delta S_t$.

Some examples of cascaded shape regression models that can be used to estimate an eye shape can include: Explicit Shape Regression (ESR), Cascaded Pose Regression (CPR), Ensemble of Regression Trees (ERT), Supervised Descent Method (SDM), Local Binary Features (LBF), Probabilistic Random Forests (PRF), Cascade Gaussian Process Regression Trees (cGPRT), Coarse-to-Fine Shape Searching (CFSS), Random Cascaded Regression Copse (R-CR-C), Cascaded Collaborative Regression method (CCR), Spatio-Temporal Cascade Shape Regression (STCSR), or other cascaded shape regression methods.

Figure 4A:
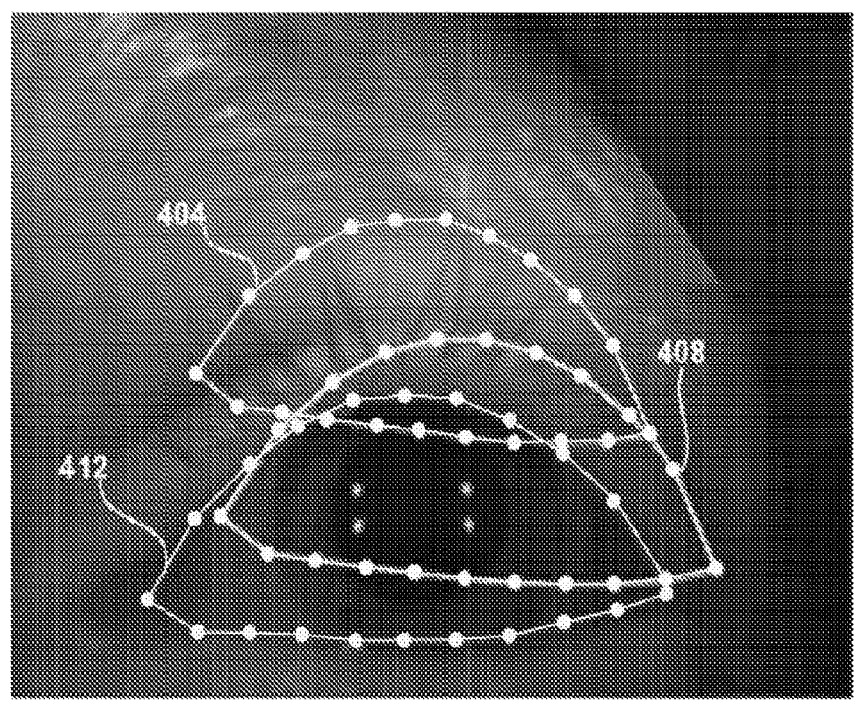
FIG. 4A schematically illustrates an example progression of a detailed eye shape model estimation.

FIG. 4A schematically illustrates an example progression of a detailed eye shape model. For simplicity, FIG. 4A only depicts the shape of an upper and lower eyelid 110a, 110b and does not illustrate the estimated shapes of an iris 112 or a pupil 114 as illustrated in FIG. 1. However, the shapes of the iris 112 and the pupil 114 may additionally or alternatively be modeled at this stage (see, e.g., the example results in FIG. 4B). In some embodiments, the initial estimated eye shape 404 may be any eye shape that is similar to the target shape 412. For example, the initial estimated eye shape can be set as a mean shape in the center of the image.

FIG. 4A depicts the eye shape regression from the initial estimated eye shape 404 to the target shape 412 performed over eleven stages. For example, the initial (zeroth) stage $S_0$, the first stage $S_1$, and the tenth stage $S_{10}$ are illustrated. For simplicity, only the intermediate eyelid shape 408 is depicted in FIG. 4A. In some embodiments, the regression model may be programmed to stop after a predetermined number of iterations (e.g., 5, 10, 20, 50, 100, or more). In other embodiments, the regression model may continue iterating until the shape increment $\Delta S_t$ at stage t is smaller than a threshold. For example, if the relative eye shape change $|\Delta S_t/S_t|$ is less than a threshold (e.g., $10^{-2}$, $10^{-3}$, or smaller), the regression model may terminate. In other embodiments, the regression model may continue iterating until the difference between the shape $S_t$ at stage t and the shape at the previous stage $S_{t-1}$ is smaller than a threshold.

In some embodiments, the detailed eye shape model 400b may comprise a plurality of boundary points 424 for the pupillary, limbic, or eyelid boundaries. The boundary points 424 may correspond to the estimated eyelid shape 412, the estimated iris shape 416, and the estimated pupil shape 420, respectively. The number of boundary points 424 can be in a range of 6-100 or more. In some implementations, the detailed eye shape model 400b can be used to determine whether a received eye image meets certain standards, e.g., quality of the image.

Figure 4B:
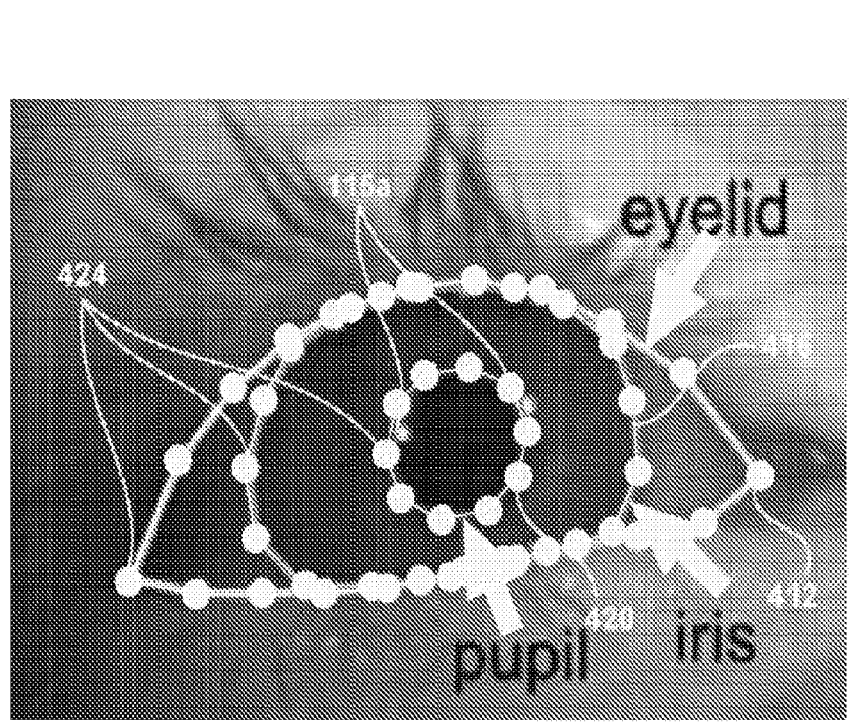
FIG. 4B schematically illustrates an example of a detailed eye shape model in which boundaries of the pupil, iris, and eyelid have been identified.

FIG. 4B illustrates an example of a completed eye shape model. This model may be determined using the eye shape estimation routine described in FIG. 3. For example, the completed eye shape model may represent the result of block 312 after an eye shape is modeled based on cascaded shape regression that has determined the pupillary, limbic, and eyelid boundaries. These boundaries are overlaid on an image of the periocular region of the eye to show the match between the calculated boundaries and the underlying eye image. As described above, the shape-indexed extraction function $\Phi_t$ can handle larger shape variations compared to a "non-shape-indexed" feature. A pairwise pixel comparison feature may be used, which may be invariant to global illumination changes.

Figure 4C:
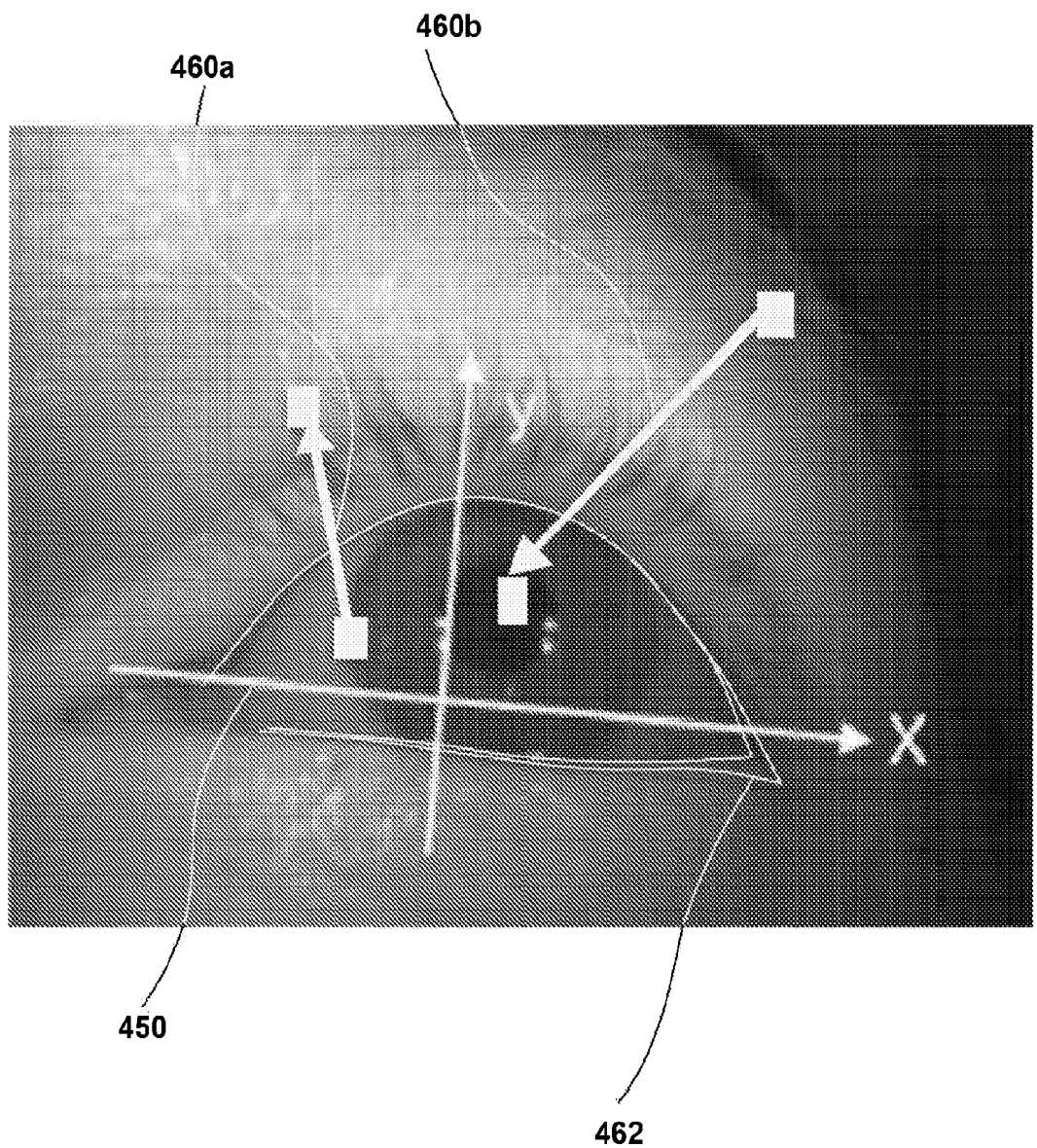
FIG. 4C is an image showing an example of two pairs of shape-indexed features.

FIG. 4C is an image showing an example of two pairs of shape-indexed features (e.g., 460a, 460b). A local coordinate system (shown as x and y axes 450) is determined by the current eye shape (e.g., the eyelid shape 462). Intensity values from a pair of pixel locations 460a, 460b (the squares connected by arrowed lines; two pair 460a, 460b of such pixel locations are shown) can be compared to provide a binary feature (e.g., a Boolean value such as 0 or 1, indicating a match or non-match). For example, a pixel located inside the pupil (e.g., the pupillary pixel in the feature 460b) may be darker in color or contrast than a pixel located outside the pupil (e.g., in the user's iris, sclera, or skin (as shown in FIG. 4C)).

In some implementations, the pixel locations may be fixed in the local coordinate system 450, which varies as the eye shape 462 is updated during the stages of the regression. In one example system, 2500 features are constructed from 400 pixel locations, which may be learned from training data. Learning from training data is described in more detail below with respect to FIG. 5.

Example of Training Images for Learning Cascaded Shape Regression

In some embodiments, the regression function $f_t$ and the shape-indexed extraction function $\Phi_t$ described above may be learned from sets of annotated (e.g., labeled) training data.

Figure 5:
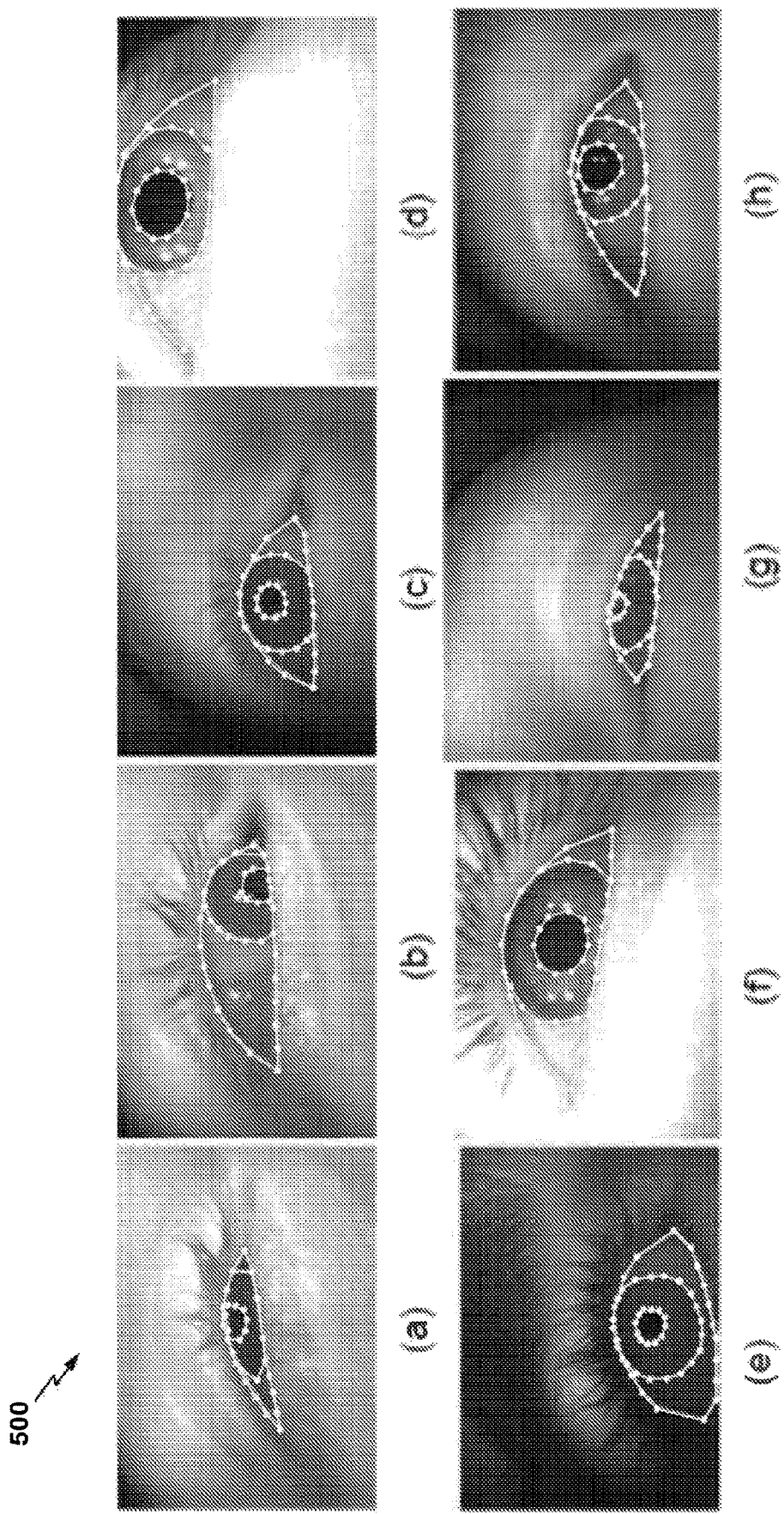
FIG. 5 illustrates an example of a set of annotated training images used for learning a regression function.

FIG. 5 illustrates an example of training data 500 that includes eight example eye images from different subjects with large shape and appearance variations (indexed as (a) through (h)). The labeled eye images advantageously should show a wide range of eye variations (e.g., normally opened eyes, blinking eyes, eyes pointing in a wide range of directions (up, down, left, right) relative to a natural resting direction, etc.) from a wide range of subjects (of different genders, ethnicities, etc.).

The training data 500 are annotated to show the features which are to be learned. In the illustrated example, these features may include pupillary, limbic, and eyelid boundaries marked on each of the images. These labeled boundaries in each of the images in the training data 500 can be determined using any appropriate pupillary, limbic, or eyelid boundary technique or by hand.

Various machine learning algorithms may be used to learn the regression function $f_t$ and the shape-indexed extraction function $\Phi_t$ from the annotated training data 500. Supervised machine learning algorithms (e.g., regression-based algorithms) can be used to learn the regression function and shape-indexed extraction function from the annotated data 500. Some examples of machine learning algorithms that can be used to generate such a model can include regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), or other machine learning algorithms.

In some embodiments, a set of training images may be stored in the remote data repository 232 illustrated in FIG. 2A. The remote processing module 228 may access the training images to learn the regression function $f_t$ and the shape-indexed extraction function $\Phi_t$. The local processing and data module 224 may then store the regression function $f_t$ and the shape-indexed extraction function $\Phi_t$ on the wearable device 200. This reduces the need for the local processing and data module 224 to perform the computationally intense process of learning the regression function $f_t$ and the shape-indexed extraction function $\Phi_t$.

In some embodiments, biometric information may be taken from the user 204 and stored on the local processing and data module 224. The biometric information can then be used by the local processing and data module 224 (or the remote processing module 228) to further train the regression function and shape-indexed extraction function based on the user's personalized eye shape and features through, for example, unsupervised learning. Such training personalizes the regression model so that it more particularly matches the features of the user's eyes and periocular region, which can improve accuracy and efficiency.

Example Eye Shape Training Routine

Figure 6:
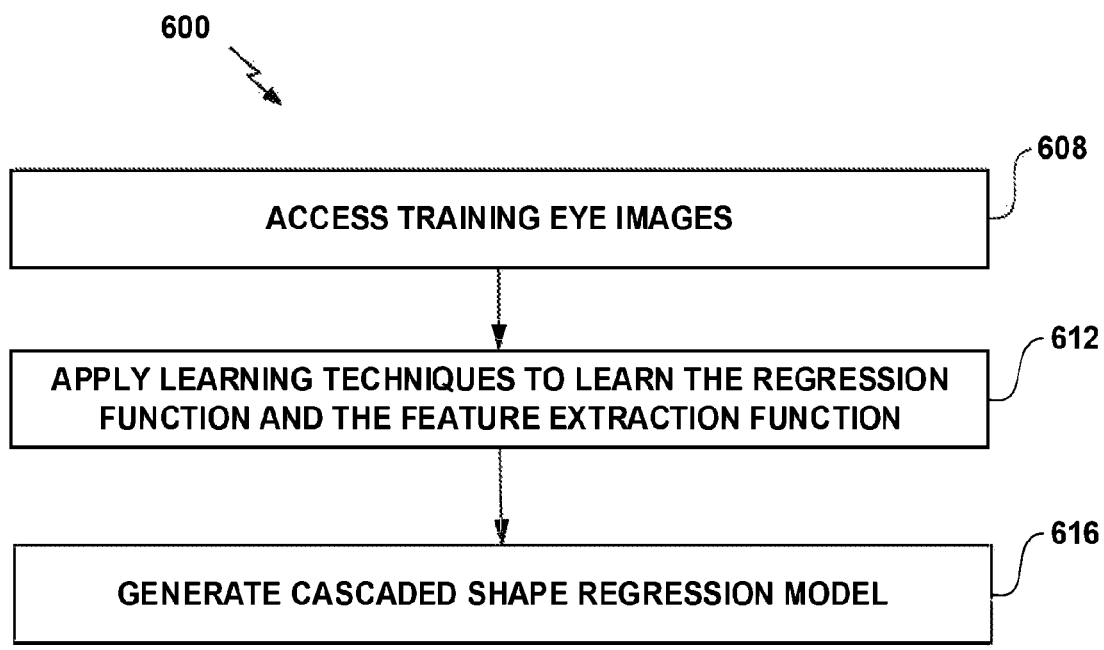
FIG. 6 is a flow diagram of an example of an eye shape training routine for learning cascaded shape regression.

FIG. 6 is a flow diagram of an example eye shape training routine 600, which may be used to learn the regression function $f_t$ and the shape-indexed extraction function $\Phi_t$. For example, the functions may be learned based on a set of training images (e.g., the images 500 shown in FIG. 5). The eye shape training routine 600 can be implemented by the processing modules 224, 228, 232 and/or by one or more other processors.

The routine 600 begins at block 608 when training data (e.g., the data 500) comprising annotated eye images are accessed. The training data can be accessed from a non-transitory data store, which stores annotated eye images. The processing module can access the non-transitory data store via wired or wireless techniques.

At block 612, a machine learning technique (e.g., supervised learning for annotated or labeled images) is applied to learn the regression function $f_t$ and the shape-indexed extraction function $\Phi_t$. A cascaded shape regression model can then be generated at block 616. This regression model enables routine 300 to estimate the detailed eye shape model at block 312. As described above, the cascaded shape regression model can be personalized to a particular user by further training the regression function and shape-indexed extraction function on eye images of the user obtained by the wearable display system 200 during use.

Example of Robust Feature Detection

Eyelid Occlusion of Pupil or Iris

Figure 7A:
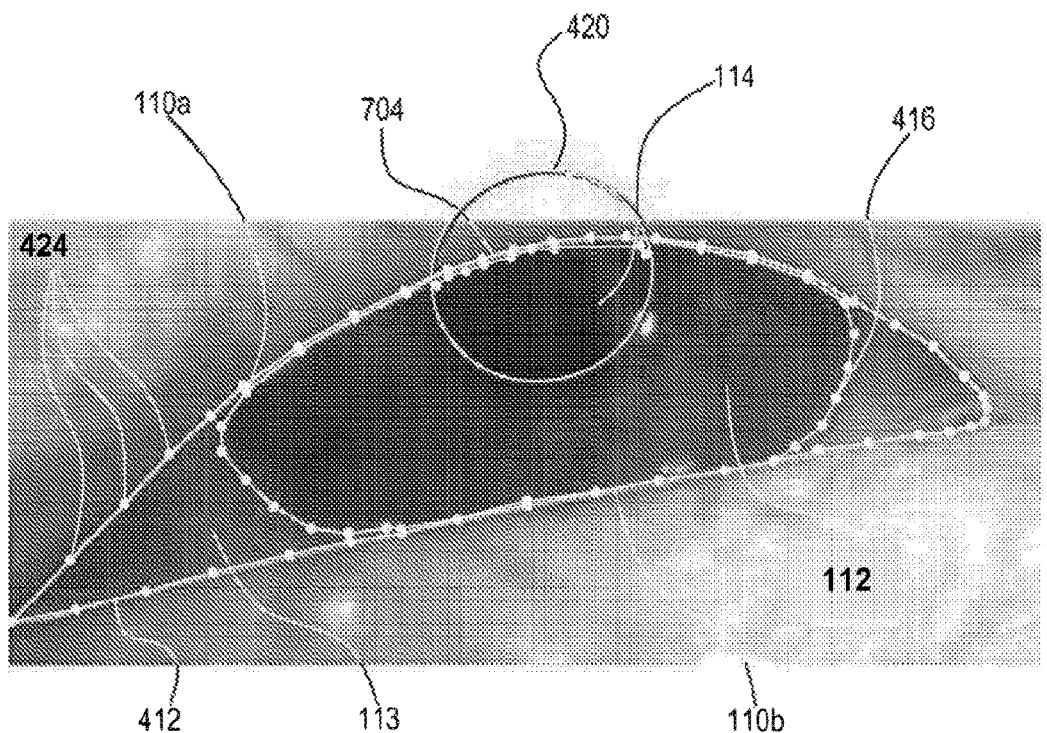
FIG. 7A schematically illustrates an example of false boundary points.

FIG. 7A illustrates boundary points 424 of a pupil that is partially occluded by the eyelids. In one embodiment for robust feature detection using a detailed eye shape model, pupil detection may be improved by removing false pupil boundary points 704. Example points 704 are shown as the arc of boundary points along the upper eyelid 110a and within the pupil boundary 420.

False pupil boundary points 704 may be created when an eyelid partially occludes the pupil as shown in FIG. 7A (where the upper eyelid 110a partially occludes the pupil 114). The points 704 therefore reflect the position of the eyelid rather than the true boundary of the pupil (which is occluded by the eyelid). Rather than include the false boundary points 704, which may lead to generation of an inaccurate model of the pupil, the false boundary points 704 may be identified and removed before a pupil boundary-finding method is performed. In some embodiments, the false pupil boundary points 704 may be any pupil boundary point that is located within a certain distance of the upper or lower eyelid. In some embodiments, the false pupil boundary points 704 may be any pupil boundary point that borders the upper or lower eyelid.

In some embodiments, once the false pupil boundary points 704 are identified and removed, an ellipse may be fitted to the pupil using the remaining pupil boundary points. Algorithms that may be implemented for such an ellipse fitting include: integro-differential operators, least-squares method, random sample consensus (RANSAC), or an ellipse or curve fitting algorithm.

It should be appreciated that while the above embodiments specifically reference false pupil boundary points, the techniques described above may also be applied to identify and remove false limbic boundary points.

In some embodiments, a detailed eye shape model may be used in conjunction with a pupil boundary finding algorithm such as, e.g., the starburst algorithm, which can be employed to detect many pupil boundary points. Using the eyelid shapes 412 of the detailed eye shape model, the boundary points determined using the starburst algorithm that border upper or lower eyelids 110a, 110b are removed, and the remaining boundary points are used to fit a pupil boundary 420. In some embodiments, the limbic boundary points that border the sclera 113 may also be identified using the detailed eye shape model. Thereafter, the iris ellipse 416 is fit using only the limbic boundary points determined to border the sclera 113. Similarly, the pupil boundary 420 may be fit using only the pupil boundary points determined to border the iris 112. In some embodiments, the detailed eye shape model may improve the robustness of the pupil boundary-finding algorithm by providing a better initial "best guess" of the pupil center based on the detailed eye shape model.

Glint Detection

In conventional gaze estimation, the pupil boundary (e.g., an ellipse in some techniques) and glints are detected by searching the entire eye image. Given the detailed eye shape model described herein, feature detection can be faster and more efficient by eliminating the need to search the entire eye for features. In some embodiments, by first identifying the different regions of the eye (e.g., sclera, pupil, or iris) the detailed eye shape model may allow feature detection in particular regions of the eye (e.g., selective feature detection).

Figure 7B:
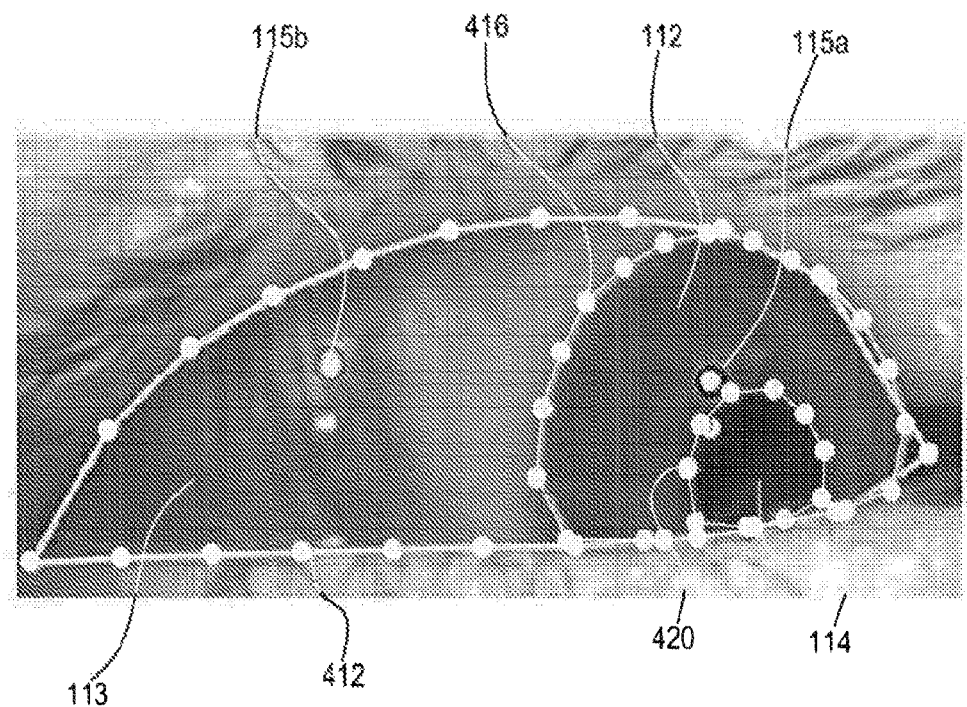
FIG. 7B schematically illustrates an example of selective feature detection.

FIG. 7B illustrates an example of selective feature detection. Glints 115a, 115b may appear in the sclera 113, the iris 112, or the pupil 114. The glints 115a, 115b, may represent reflections from one or more light sources (e.g., LEDs, such as infra-red LEDs). In certain biometric applications, it may be necessary or desirable to identify glints in certain regions of the eye (e.g., the iris, which represent corneal reflections) while ignoring glints outside of those regions (e.g., the sclera). For example, when determining gaze in certain techniques, scleral glints 115b, located in the sclera 113, may not represent the reflection of the light source from the cornea, and their inclusion in the gaze technique leads to inaccuracies in the estimated gaze. Therefore, it may be advantageous to use a detailed eye shape model to search for and identify iris glints 115a located within the iris 112 or within the limbic boundary 416.

As illustrated in FIG. 7B, iris glints 115a are within the iris 112 and therefore may be preferred for gaze estimation. In contrast, the scleral glints 115b appear in the sclera 113 and therefore may not be preferred for gaze estimation. Accordingly, embodiments of the techniques disclosed herein can be used to identify the eye regions where glints are likely to occur and eye regions outside these regions do not need to be searched, which improves the accuracy, speed, and efficiency of the technique.

Blink Detection

In some embodiments, feature detection can be more robust and efficient by using a detailed eye shape model to determine whether a received eye image meets certain quality thresholds. For example, the detailed eye shape model may be used to determine whether the eye is sufficiently open to estimate a reliable eye shape and to extract features and to perform a biometric application (e.g., gaze finding or biometric authentication/identification).

In some embodiments, an eye image may be discarded based on one or more quality measures. For example, if the distance between the upper eyelid 110a and the lower eyelid 110b is less than a threshold, the eye image is considered unusable and is discarded, and accordingly no features are extracted for biometric application. In some embodiments, the eye image may be rejected if the upper eyelid 110a and the lower eyelid 110b are separated by no more than 5 mm. In another embodiment, the eye image may be rejected if greater than a certain percentage of the pupil 114 or iris 112 is occluded by one or more of the eyelids 110a, 110b (e.g., greater than 40%, 50%, 60%, 75%, or more). In another embodiment, the eye image may be rejected if a number of pupil boundary points 704 border the upper eyelid 110a or lower eyelid 110b. For example, if roughly half of the pupil boundary points 704 border an eyelid 110a, 110b, it may be concluded that roughly half of the pupil 114 is occluded by the eyelid, and thus, the eye image is unsuitable for biometric applications.

In other embodiments, rather than rejecting and discarding the eye image, the eye image is assigned a lower weight in a biometric application than eye images in which there is less occlusion of the eye (e.g., images where the distance between the upper eyelid 110a and the lower eyelid 110b is greater than the threshold).

Example of an Eye Tracking System

Figure 8:
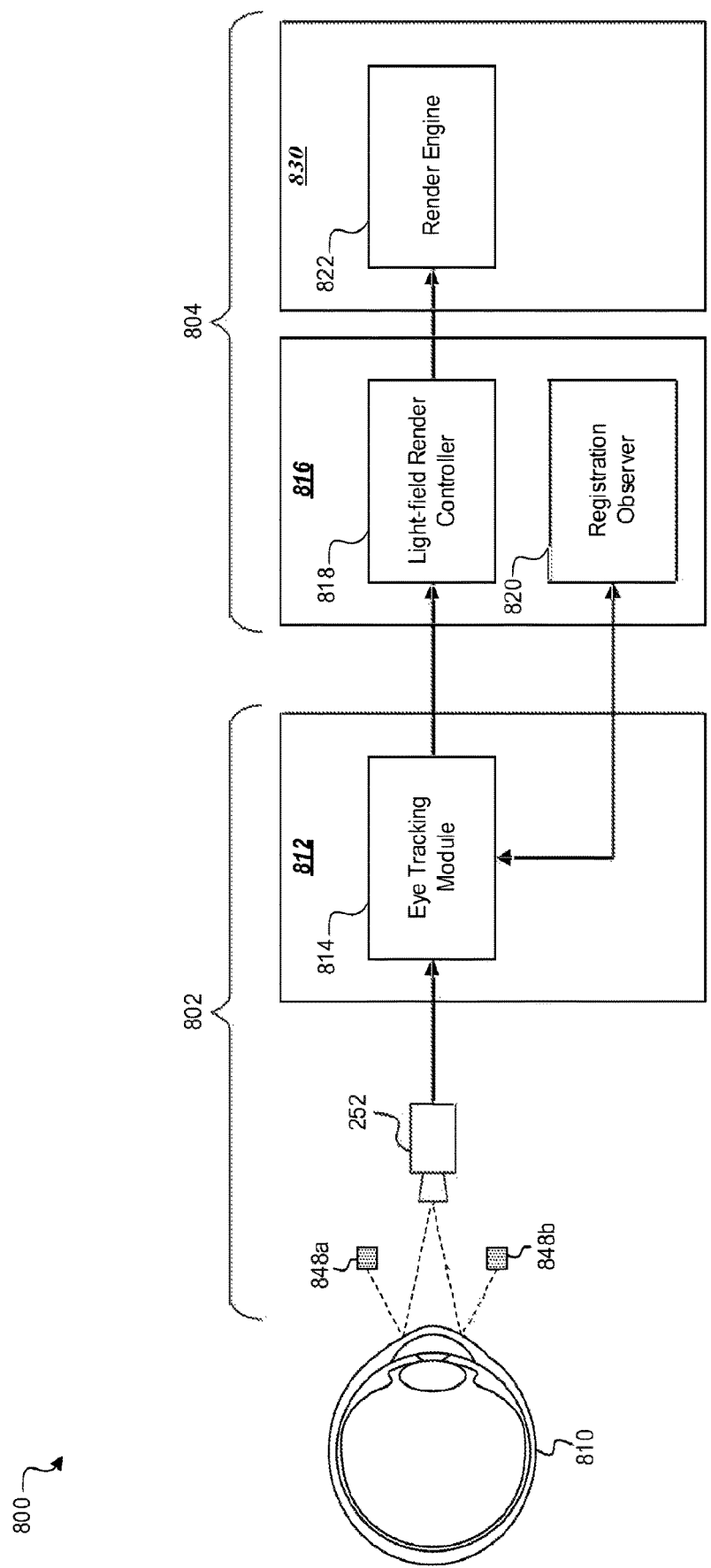
FIG. 8 is a schematic diagram of a wearable system that includes an eye tracking system.

FIG. 8 illustrates a schematic diagram of a wearable system 800 that includes an eye tracking system. The wearable system 800 may, in at least some embodiments, include components located in a head-mounted unit 802 and components located in a non-head-mounted unit 804. Non-head mounted unit 804 may be, as examples, a belt-mounted component, a hand-held component, a component in a backpack, a remote component, etc. Incorporating some of the components of the wearable system 800 in non-head-mounted unit 804 may help to reduce the size, weight, complexity, and cost of the head-mounted unit 802.

In some implementations, some or all of the functionality described as being performed by one or more components of head-mounted unit 802 and/or non-head mounted 804 may be provided by way of one or more components included elsewhere in the wearable system 800. For example, some or all of the functionality described below in association with a processor (e.g., CPU 812) of head-mounted unit 802 may be provided by way of a processor (e.g., CPU 816) of non-head mounted unit 804, and vice versa.

In some examples, some or all of such functionality may be provided by way of peripheral devices of wearable system 800. Furthermore, in some implementations, some or all of such functionality may be provided by way of one or more cloud computing devices or other remotely-located computing devices in a manner similar to that which has been described above with reference to FIG. 2A.

As shown in FIG. 8, wearable system 800 can include an eye tracking system including a camera 252 that captures images of a user's eye 810. If desired, the eye tracking system may also include light sources 848a and 848b (such as light emitting diodes "LED"s). The light sources 848a and 848b may generate glints (e.g., reflections off of the user's eyes that appear in images of the eye captured by camera 252). The positions of the light sources 848a and 848b relative to the camera 252 may be known and, as a consequence, the positions of the glints within images captured by camera 252 may be used in tracking the user's eyes.

In at least one embodiment, there may be one light source 848 and one camera 252 associated with a single one of the user's eyes 810. In another embodiment, there may be one light source 848 and one camera 252 associated with each of a user's eyes 810, as is the case in the example described above with reference to FIG. 2A. In yet other embodiments, there may be one or more cameras 252 and one or more light sources 848 associated with one or each of a user's eyes 810. As a specific example, there may be two light sources 848a and 848b and one or more cameras 252 associated with each of a user's eyes 810. As another example, there may be three or more light sources such as light sources 848a and 848b and one or more cameras 252 associated with each of a user's eyes 810.

Eye tracking module 814 may receive images from eye tracking camera(s) 252 and may analyze the images to extract various pieces of information. As examples, the eye tracking module 814 may detect the user's eye poses, a three-dimensional position of the user's eye relative to the eye tracking camera 252 (and to the head-mounted unit 802), the direction on which one or both of the user's eyes 810 are focused, the user's vergence depth (e.g., the depth from the user at which the user is focusing on), the positions of the user's pupils, the positions of the user's cornea and cornea sphere, the center of rotation of each of the user's eyes, and/or the center of perspective of each of the user's eyes.

The eye tracking module 814 may extract such information using techniques described below. Additional systems and techniques for extracting and using eye tracking information are provided in U.S. patent application Ser. Nos. 16/250,931 and 16/251,017 filed on Jan. 17, 2019, both of which are expressly incorporated herein by reference in their entirety for all purposes. In some implementations, one or more such systems and techniques for extracting and using eye tracking information may be employed as part of or in conjunction with one or more of the systems and techniques described herein. As shown in FIG. 8, eye tracking module 814 may be a software module implemented using a CPU 812 in a head-mounted unit 802.

Data from eye tracking module 814 may be provided to other components in the wearable system. As example, such data may be transmitted to components in a non-head-mounted unit 804 such as CPU 816 including software modules for a light-field render controller 818 and a registration observer 820.

Render controller 818 may use information from eye tracking module 814 to adjust images displayed to the user by render engine 822. For example, a render engine may represent a software module in GPU 830 and may provide images to display 208. The render controller 818 may adjust images displayed to the user based on the user's center of rotation or center of perspective. In particular, the render controller 818 may use information on the user's center of perspective to simulate a render camera (e.g., to simulate collecting images from the user's perspective) and may adjust images displayed to the user based on the simulated render camera. Additional details regarding operations that may be performed by the light-field render controller 818 are provided in U.S. patent application Ser. No. 16/250,931, which is incorporated by reference herein in its entirety.

A "render camera," which is sometimes also referred to as a "pinhole perspective camera" (or "perspective camera") or "virtual pinhole camera" (or "virtual camera"), is a simulated camera for use in rendering virtual image content possibly from a database of objects in a virtual world. The objects may have locations and orientations relative to the user or wearer and possibly relative to real objects in the environment surrounding the user or wearer. In other words, the render camera may represent a perspective within render space from which the user or wearer is to view 3D virtual contents of the render space (e.g., virtual objects). The render camera may be managed by a render engine to render virtual images based on the database of virtual objects to be presented to said eye.

The virtual images may be rendered as if taken from the perspective the user or wearer. For example, the virtual images may be rendered as if captured by a pinhole camera (corresponding to the "render camera") having a specific set of intrinsic parameters (e.g., focal length, camera pixel size, principal point coordinates, skew/distortion parameters, etc.), and a specific set of extrinsic parameters (e.g., translational components and rotational components relative to the virtual world).

The virtual images may be taken from the perspective of such a camera having a position and orientation of the render camera (e.g., extrinsic parameters of the render camera). It follows that the system may define and/or adjust intrinsic and extrinsic render camera parameters. For example, the system may define a particular set of extrinsic render camera parameters such that virtual images may be rendered as if captured from the perspective of a camera having a specific location with respect to the user's or wearer's eye so as to provide images that appear to be from the perspective of the user or wearer.

The system may later dynamically adjust extrinsic render camera parameters on-the-fly so as to maintain registration with said specific location. Similarly, intrinsic render camera parameters may be defined and dynamically adjusted over time. In some implementations, the images are rendered as if captured from the perspective of a camera having an aperture (e.g., pinhole) at a specific location with respect to the user's or wearer's eye (such as the center of perspective or center of rotation, or elsewhere).

In some embodiments, the system may create or dynamically reposition and/or reorient one render camera for the user's left eye, and another render camera for the user's right eye, as the user's eyes are physically separated from one another and thus consistently positioned at different locations. It follows that, in at least some implementations, virtual content rendered from the perspective of a render camera associated with the viewer's left eye may be presented to the user through an eyepiece on the left side of a head-mounted display (e.g., head-mounted unit 802). Virtual content rendered from the perspective of a render camera which is associated with the user's right eye may be presented to the user through an eyepiece on the right side of such a head-mounted display.

Further details discussing the creation, adjustment, and use of render cameras in rendering processes are provided in U.S. patent application Ser. No. 15/274,823, entitled "METHODS AND SYSTEMS FOR DETECTING AND COMBINING STRUCTURAL FEATURES IN 3D RECONSTRUCTION," which is expressly incorporated herein by reference in its entirety for all purposes.

In some examples, one or more modules (or components) of the system 800 (e.g., light-field render controller 818, render engine 822, etc.) may determine the position and orientation of the render camera within render space based on the position and orientation of the user's head and eyes (e.g., as determined based on head pose and eye tracking data, respectively). That is, the system 800 may effectively map the position and orientation of the user's head and eyes to particular locations and angular positions within a 3D virtual environment, place and orient render cameras at the particular locations and angular positions within the 3D virtual environment, and render virtual content for the user as it would be captured by the render camera. Further details discussing real world to virtual world mapping processes are provided in U.S. patent application Ser. No. 15/296,869, entitled "SELECTING VIRTUAL OBJECTS IN A THREE-DIMENSIONAL SPACE," which is expressly incorporated herein by reference in its entirety for all purposes.

As an example, the render controller 818 may adjust the depths at which images are displayed by selecting which depth plane, or depth planes, are utilized at any given time to display the images. In some implementations, such a depth plane switch may be carried out through an adjustment of one or more intrinsic render camera parameters. For example, the light-field render controller 818 may adjust the focal lengths of render cameras when executing a depth plane switch or adjustment. As described in further detail below, depth planes may be switched based on the user's determined vergence or fixation depth.

Registration observer 820 may use information from eye tracking module 814 to identify whether the head-mounted unit 802 is properly positioned on a user's head. As an example, the eye tracking module 814 may provide eye location information, such as the positions of the centers of rotation of the user's eyes, which is indicative of the three-dimensional position of the user's eyes relative to camera 252 and head-mounted unit 802. The eye tracking module 814 may use the location information to determine if display 208 is properly aligned in the user's field of view, or if the head-mounted unit 802 (or headset) has slipped or is otherwise misaligned with the user's eyes.

As an example, the registration observer 820 may be able to determine if the head-mounted unit 802 has slipped down the user's nose bridge. This may cause movement of the display 208 away and down from the user's eyes (which may be undesirable). As another example, the registration observer 820 may determine that the head-mounted unit 802 has been moved up the user's nose bridge, thus moving display 208 closer and up from the user's eyes. As another example, the registration observer 820 may determine that the head-mounted unit 802 has been shifted left or right relative the user's nose bridge. As another example, the registration observer 820 may determine that the head-mounted unit 802 has been lifted above the user's nose bridge. As another example, the registration observer 820 may determine that the head-mounted unit 802 has been moved in these or other ways away from a desired position or range of positions.

In general, registration observer 820 may be able to determine if head-mounted unit 802, in general, and displays 208, in particular, are properly positioned in front of the user's eyes. In other words, the registration observer 820 may determine if a left display in display system 208 is appropriately aligned with the user's left eye and a right display in display system 208 is appropriately aligned with the user's right eye. The registration observer 820 may determine if the head-mounted unit 802 is properly positioned by determining if the head-mounted unit 802 is positioned and oriented within a desired range of positions and/or orientations relative to the user's eyes.

In at least some embodiments, registration observer 820 may generate user feedback in the form of alerts, messages, or other content. Such feedback may be provided to the user to inform the user of any misalignment of the head-mounted unit 802, along with optional feedback on how to correct the misalignment (such as a suggestion to adjust the head-mounted unit 802 in a particular manner).

Example registration observation and feedback techniques, which may be utilized by registration observer 820, are described in U.S. patent application Ser. No. 16/251,017, filed on Jan. 17, 2019, which is incorporated by reference herein in its entirety.

Example of an Eye Tracking Module

Figure 9:
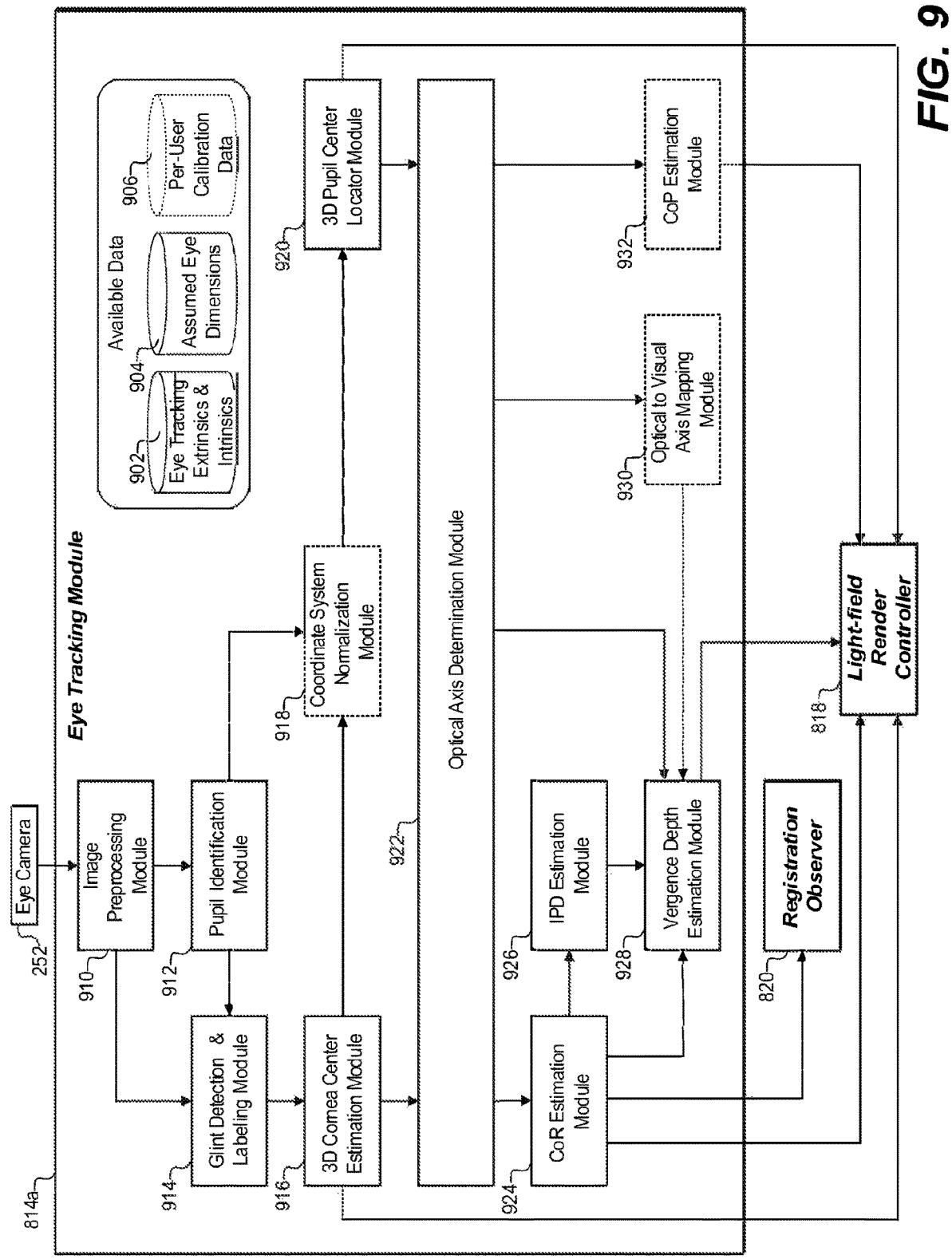
FIG. 9 is a block diagram of a wearable system that may include an eye tracking system.

A detailed block diagram of an example eye tracking module 814a is shown in FIG. 9. In some implementations, eye tracking module 814a may correspond to eye tracking module 814 of system 800 as described above with reference to FIG. 8.

As shown in FIG. 9, eye tracking module 814a may include a variety of different submodules, may provide a variety of different outputs, and may utilize a variety of available data in tracking the user's eyes. As examples, eye tracking module 814a may utilize available data including eye tracking extrinsics and intrinsics, such as the geometric arrangements of the eye tracking camera 252 relative to the light sources 848 and the head-mounted-unit 802; assumed eye dimensions 904, such as a typical distance of approximately 4.7 mm between a user's center of cornea curvature and the average center of rotation of the user's eye or typical distances between a user's center of rotation and center of perspective; and per-user calibration data 906, such as a particular user's interpupillary distance.

Additional examples of extrinsics, intrinsics, and other information that may be employed by the eye tracking module 814a are described in U.S. patent application Ser. No. 15/497,726, filed Apr. 26, 2017, which is incorporated by reference herein in its entirety.

Image preprocessing module 910 may receive images from an eye camera such as eye camera 252 and may perform one or more preprocessing (e.g., conditioning) operations on the received images. As an example, image preprocessing module 910 may apply a Gaussian blur to the images. As another example, image preprocessing module 910 may down sample the images to a lower resolution. As another example, image preprocessing module 910 may apply an unsharp mask. As another example, image preprocessing module 910 may apply an edge sharpening algorithm. As another example, image preprocessing module 910r may apply other suitable filters that assist with the later detection, localization, and labelling of glints, a pupil, or other features in the images from eye camera 252. The image preprocessing module 910 may apply a low-pass filter or a morphological filter such as an open filter, which can remove high-frequency noise such as from the pupillary boundary 516a (see FIG. 5), thereby removing noise that can hinder pupil and glint determination. The image preprocessing module 910 may output preprocessed images to the pupil identification module 912 and to the glint detection and labeling module 914.

Pupil identification module 912 may receive preprocessed images from the image preprocessing module 910 and may identify regions of those images that include the user's pupil. The pupil identification module 912 may, in some embodiments, determine the coordinates of the position, or coordinates, of the center, or centroid, of the user's pupil in the eye tracking images from camera 252.

In at least some embodiments, pupil identification module 912 may identify contours in eye tracking images (e.g., contours of pupil iris boundary), identify contour moments (e.g., centers of mass), apply a starburst pupil detection and/or a canny edge detection algorithm, reject outliers based on intensity values, identify sub-pixel boundary points, correct for eye-camera distortion (e.g., distortion in images captured by eye camera 252), apply a random sample consensus (RANSAC) iterative algorithm to fit an ellipse to boundaries in the eye tracking images, apply a tracking filter to the images, and identify sub-pixel image coordinates of the user's pupil centroid.

The pupil identification module 912 may output pupil identification data, which may indicate which regions of the preprocessing images module 912 identified as showing the user's pupil, to glint detection and labeling module 914. The pupil identification module 912 may provide the 2D coordinates of the user's pupil (e.g., the 2D coordinates of the centroid of the user's pupil) within each eye tracking image to glint detection module 914. In at least some embodiments, pupil identification module 912 may also provide pupil identification data of the same sort to coordinate system normalization module 918.

Pupil detection techniques, which may be utilized by pupil identification module 912, are described in U.S. Patent Publication No. 2017/0053165, published Feb. 23, 2017, U.S. Patent Publication No. 2017/0053166, published Feb. 23, 2017, and in U.S. patent application Ser. No. 15/693,975, published on Mar. 7, 2019, each of which is incorporated by reference herein in its entirety.

Glint detection and labeling module 914 may receive preprocessed images from module 910 and pupil identification data from module 912. Glint detection module 914 may use this data to detect and/or identify glints (e.g., reflections off of the user's eye of the light from light sources 848) within regions of the preprocessed images that show the user's pupil. As an example, the glint detection module 914 may search for bright regions within the eye tracking image, sometimes referred to herein as "blobs" or local intensity maxima, which are in the vicinity of the user's pupil.

In at least some embodiments, the glint detection module 914 may rescale (e.g., enlarge) the pupil ellipse to encompass additional glints. The glint detection module 914 may filter glints by size and/or by intensity. The glint detection module 914 may also determine the 2D positions of each of the glints within the eye tracking image. In at least some examples, the glint detection module 914 may determine the 2D positions of the glints relative to the user's pupil, which may also be referred to as the pupil-glint vectors. Glint detection and labeling module 914 may label the glints and output the preprocessing images with labeled glints to the 3D cornea center estimation module 916. Glint detection and labeling module 914 may also pass along data such as preprocessed images from module 910 and pupil identification data from module 912.

In some implementations, the glint detection and labeling module 914 may determine which light source (e.g., from among a plurality of light sources of the system including infrared light sources 848a and 848b) produced each identified glint. In these examples, the glint detection and labeling module 914 may label the glints with information identifying the associated light source and output the preprocessing images with labeled glints to the 3D cornea center estimation module 916. In some implementations, the glint detection and labeling module 914 may be configured to utilize one or more of the glint detection techniques described above with reference to FIG. 7B.

Pupil and glint detection, as performed by modules such as modules 912 and 914, can use any suitable techniques. As examples, edge detection can be applied to the eye image to identify glints and pupils. Edge detection can be applied by various edge detectors, edge detection algorithms, or filters. For example, a Canny Edge detector can be applied to the image to detect edges such as in lines of the image. Edges may include points located along a line that correspond to the local maximum derivative. For example, the pupillary boundary 516a (see FIG. 5) can be located using a Canny edge detector.

With the location of the pupil determined, various image processing techniques can be used to detect the "pose" of the pupil 116. Determining an eye pose of an eye image can also be referred to as detecting an eye pose of the eye image. The pose can also be referred to as the gaze, pointing direction, or the orientation of the eye. For example, the pupil may be looking leftwards towards an object, and the pose of the pupil could be classified as a leftwards pose. Other methods can be used to detect the location of the pupil or glints. For example, a concentric ring can be located in an eye image using a Canny Edge detector. As another example, an integro-differential operator can be used to find the pupillary or limbus boundaries of the iris. For example, the Daugman integro-differential operator, the Hough transform, or other iris segmentation techniques can be used to return a curve that estimates the boundary of the pupil or the iris.

3D cornea center estimation module 916 may receive preprocessed images including detected glint data and pupil identification data from modules 910, 912, 914. 3D cornea center estimation module 916 may use these data to estimate the 3D position of the user's cornea. In some embodiments, the 3D cornea center estimation module 916 may estimate the 3D position of an eye's center of cornea curvature or a user's corneal sphere, e.g., the center of an imaginary sphere having a surface portion generally coextensive with the user's cornea. The 3D cornea center estimation module 916 may provide data indicating the estimated 3D coordinates of the corneal sphere and/or user's cornea to the coordinate system normalization module 918, the optical axis determination module 922, and/or the light-field render controller 818.

Techniques for estimating the positions of eye features such as a cornea or corneal sphere, which may be utilized by 3D cornea center estimation module 916 and other modules in the wearable systems of the present disclosure are discussed in U.S. patent application Ser. No. 16/250,931, filed on Jan. 17, 2019, which is incorporated by reference herein in its entirety.

Coordinate system normalization module 918 may optionally be included in eye tracking module 814a. Coordinate system normalization module 918 may receive data indicating the estimated 3D coordinates of the center of the user's cornea, and/or the center of the user's corneal sphere, from the 3D cornea center estimation module 916 and may also receive data from other modules. Coordinate system normalization module 918 may normalize the eye camera coordinate system, which may help to compensate for slippages of the wearable device. For example, slippage may include slippages of the head-mounted component from its normal resting position on the user's head which may be identified by registration observer 820.

Coordinate system normalization module 918 may rotate the coordinate system to align the z-axis (e.g., the vergence depth axis) of the coordinate system with the cornea center (e.g., as indicated by the 3D cornea center estimation module 916). The module 918 may also translate the camera center (e.g., the origin of the coordinate system) to a predetermined distance away from the cornea center. Example distances may include, 25 mm, 30 mm, 35 mm, and so on. For example, module 918 may enlarge or shrink the eye tracking image depending on whether the eye camera 252 was determined to be nearer or further than the predetermined distance. With this normalization process, the eye tracking module 814a may be able to establish a consistent orientation and distance in the eye tracking data, relatively independent of variations of headset positioning on the user's head.

Coordinate system normalization module 918 may also provide 3D coordinates of the center of the cornea (and/or corneal sphere), pupil identification data, and preprocessed eye tracking images to the 3D pupil center locator module 920. Further details of operations that may be performed by the coordinate system normalization module 918 are provided in U.S. patent application Ser. No. 16/250,931, which is incorporated by reference herein in its entirety.

3D pupil center locator module 920 may receive data, in the normalized or the un-normalized coordinate system, including the 3D coordinates of the center of the user's cornea (and/or corneal sphere), pupil location data, and preprocessed eye tracking images. 3D pupil center locator module 920 may analyze such data to determine the 3D coordinates of the center of the user's pupil in the normalized or un-normalized eye camera coordinate system. The 3D pupil center locator module 920 may determine the location of the user's pupil in three-dimensions based on the 2D position of the pupil centroid (e.g., determined by module 912), the 3D position of the cornea center (e.g., determined by module 916), assumed eye dimensions 904 such as the size of the a typical user's corneal sphere and the typical distance from the cornea center to the pupil center, and/or optical properties of eyes such as the index of refraction of the cornea (relative to the index of refraction of air) or any combination of these. Further details of operations that may be performed by the 3D pupil center locator module 920 are provided in U.S. patent application Ser. No. 16/250,931, which is incorporated by reference herein in its entirety.

Optical axis determination module 922 may receive data from modules 916 and 920 indicating the 3D coordinates of the center of the user's cornea and the user's pupil. Based on such data, the optical axis determination module 922 may identify a vector from the position of the cornea center (e.g., from the center of the corneal sphere) to the center of the user's pupil, which may define the optical axis of the user's eye. Optical axis determination module 922 may provide outputs specifying the user's optical axis to modules 924, 928, 930, and 932, as examples.

Center of rotation (CoR) estimation module 924 may receive data from module 922 including parameters of the optical axis of the user's eye (e.g., data indicating the direction of the optical axis in a coordinate system with a known relation to the head-mounted unit 802). For example, CoR estimation module 924 may estimate the center of rotation of a user's eye. The center of rotation may indicate a point around which the user's eye rotates (e.g., when the user eye rotates left, right, up, and/or down). While eyes may not rotate perfectly around a singular point, assuming a singular point may, in some embodiments, be sufficient. In some embodiments, additional points may be considered.

In at least some embodiments, CoR estimation module 924 may estimate an eye's center of rotation by moving from the center of the pupil (e.g., identified by module 920) or the center of curvature of the cornea (e.g., identified by module 916) toward the retina along the optical axis (e.g., identified by module 922) a particular distance. This particular distance may be an assumed eye dimension 904. As one example, the particular distance between the center of curvature of the cornea and the CoR may be approximately 4.7 mm. This distance may be varied for a particular user based on any relevant data including the user's age, sex, vision prescription, other relevant characteristics, etc. Additional discussion of the value of 4.7 mm as an estimate for the distance between the center of curvature of the cornea and the CoR is provided in in U.S. patent application Ser. No. 16/250,931, which is incorporated by reference herein in its entirety.

In at least some embodiments, the CoR estimation module 924 may refine its estimate of the center of rotation of each of the user's eyes over time. As an example, as time passes, the user will eventually rotate their eyes (e.g., to look somewhere else, at something closer, further, or sometime left, right, up, or down) causing a shift in the optical axis of each of their eyes. CoR estimation module 924 may then analyze two (or more) optical axes identified by module 922 and locate the 3D point of intersection of those optical axes. The CoR estimation module 924 may then determine the center of rotation lies at that 3D point of intersection. Such a technique may provide for an estimate of the center of rotation, with an accuracy that improves over time.

Various techniques may be employed to increase the accuracy of the CoR estimation module 924 and the determined CoR positions of the left and right eyes. As an example, the CoR estimation module 924 may estimate the CoR by finding the average point of intersection of optical axes determined for various different eye poses over time. As another example, module 924 may filter or average estimated CoR positions over time. As another example, module 924 may calculate a moving average of estimated CoR positions over time. As another example, module 924 may apply a Kalman filter and known dynamics of the eyes and eye tracking system to estimate the CoR positions over time.

In some implementations, a least-squares approach may be taken to determine one or more points of intersection of optical axes. In such implementations, the system may, at a given point in time, identify a location at which the sum of the squared distances to a given set of optical axes is minimized as the point of optical axes intersection. As a specific example, module 924 may calculate a weighted average of determined points of optical axes intersection and assumed CoR positions (such as 4.7 mm from an eye's center of cornea curvature), such that the determined CoR may slowly drift from an assumed CoR position (e.g., 4.7 mm behind an eye's center of cornea curvature) to a slightly different location within the user's eye over time as eye tracking data for the user is obtain and thereby enables per-user refinement of the CoR position.

Under certain conditions (e.g., substantially ideal), the 3D position of the true CoR of a user's eye relative to the HMD should change a negligible or minimal amount over time as the user moves their eye (e.g., as the user's eye rotates around its center of rotation). For example, for a given set of eye movements the 3D position of the true CoR of the user's eye (e.g., relative to the HMD) should hypothetically vary less over time than any other point along the optical axis of the user's eye. As such, it follows that the further away a point along the optical axis is from the true CoR of the user's eye, the more variation or variance its 3D position will exhibit over time as the user moves their eye. In some embodiments, the CoR estimation module 924 and/or other submodules of eye tracking module 814*a* may make use of this statistical relationship to improve CoR estimation accuracy. In such embodiments, the CoR estimation module 924 and/or other submodules of eye tracking module 814*a* may refine their estimates of the CoR 3D position over time by identifying variations of its CoR estimates having a low variation (e.g., low variance or standard deviation).

As a first example and in embodiments where the CoR estimation module 924 estimates CoR based on intersection of multiple different optical axes (e.g., each associated with the user looking in a different direction), the CoR estimation module 924 may make use of this statistical relationship (e.g., that the true CoR should have a low variance) by introducing common offsets to the direction of each of the optical axes (e.g., shifting each axis by some uniform amount) and determining if the offset optical axes intersect with each other in an intersection point having a low variation (e.g., low variance or standard deviation). This may correct for minor systemic errors in calculating the directions of the optical axes and help to refine the estimated position of the CoR to be closer to the true CoR.

A second example is with respect to embodiments in which the CoR estimation module 924 estimates CoR by moving along an optical axis, or other axis, by a particular distance (e.g., such as the distance between the center of curvature of the cornea and the CoR). For this second example, the system may vary, optimize, tune, or otherwise adjust the particular distance between the center of curvature of the cornea and the CoR over time (e.g., for a large group of images of the eye captured at different times) in a manner so as to reduce or minimize the variation, for example, variance and/or standard deviation of the estimated CoR position.

For example, if the CoR estimation module 924 initially uses a particular distance value of 4.7 mm (e.g., from the center of curvature of the cornea and along the optical axis) to obtain CoR position estimates, but the true CoR of a given user's eye may be positioned 4.9 mm behind the eye's center of cornea curvature (e.g., along the optical axis), then an initial set of CoR position estimates obtained by the CoR estimation module 924 may exhibit a relatively high amount of variation, e.g., variance or standard deviation. In response to detecting such a relatively high amount of variation (e.g., variance or standard deviation), the CoR estimation module 924 may determine one or more points along the optical axis having a lower amount of variation (e.g., variance or standard deviation). Thus, the module 924 may identify the 4.9 mm distance as having the lowest variation (e.g., variance or standard deviation), and may therefore adjust the particular distance value utilized to 4.9 mm.

The CoR estimation module 924 may determine alternative CoR estimations having lower variation (e.g., variance and/or standard deviation) in response to detecting that a current CoR estimate has a relatively high amount of variation (e.g., variance or standard deviation). The module 924 may also determine alternative CoR estimations having lower variation (e.g. variance or standard deviation) as a matter of course after obtaining initial CoR estimates. In some examples, such an optimization/adjustment can happen gradually over time, while in other examples, such an optimization/adjustment can be made during an initial user calibration session. In examples where such a procedure is conducted during a calibration procedure, the CoR estimation module 924 may not initially subscribe/adhere to any assumed particular distance, but may rather collect a set of eye tracking data over time, perform statistical analysis on the set of eye tracking data, and determine the particular distance value yielding CoR position estimates with the least possible amount (e.g., global minima) of variation (e.g. variance or standard deviation) based on the statistical analysis.

Additional discussion of the statistical relationship described above (e.g., that the true CoR should have low variance or standard deviation), as well as the significance of taking into account corneal refraction in determining pupil position, is provided in in U.S. patent application Ser. No. 16/250,931, which is incorporated by reference herein in its entirety.

Interpupillary distance (IPD) estimation module 926 may receive data from CoR estimation module 924 indicating the estimated 3D positions of the centers of rotation of the user's left and right eyes. IPD estimation module 926 may then estimate a user's IPD by measuring the 3D distance between the centers of rotation of the user's left and right eyes. In general, the distance between the estimated CoR of the user's left eye and the estimated CoR of the user's right eye may be roughly equal to the distance between the centers of a user's pupils, when the user is looking at about optical infinity. For example, this may refer to the optical axes of the user's eyes being substantially parallel to one another. This may refer to the typical definition of interpupillary distance (IPD).

A user's IPD may be used by various components and modules in the wearable system. As example, a user's IPD may be provided to registration observer 820 and used in assessing how well the wearable device is aligned with the user's eyes (e.g., whether the left and right display lenses are properly spaced in accordance with the user's IPD). As another example, a user's IPD may be provided to vergence depth estimation module 928 and be used in determining a user's vergence depth. Module 926 may employ various techniques, such as those discussed in connection with CoR estimation module 924, to increase the accuracy of the estimated IPD. As examples, IPD estimation module 924 may apply filtering, averaging over time, weighted averaging including assumed IPD distances, Kalman filters, etc. as part of estimating a user's IPD in an accurate manner.

Vergence depth estimation module 928 may receive data from various modules and submodules in the eye tracking module 814a (as shown in connection with FIG. 9). In particular, vergence depth estimation module 928 may employ data indicating estimated 3D positions of pupil centers (e.g., as provided by module 920 described above), one or more determined parameters of optical axes (e.g., as provided by module 922 described above), estimated 3D positions of centers of rotation (e.g., as provided by module 924 described above), estimated IPD (e.g., Euclidean distance(s) between estimated 3D positions of centers of rotations) (e.g., as provided by module 926 described above), and/or one or more determined parameters of optical and/or visual axes (e.g., as provided by module 922 and/or module 930 described below).

Vergence depth estimation module 928 may detect or otherwise obtain a measure of a user's vergence depth. Vergence depth may indicate the distance from the user at which the user's eyes are focused. As an example, when the user is looking at an object three feet in front of them, the user's left and right eyes have a vergence depth of three feet. As another example, when the user is looking at a distant landscape, the user's left and right eyes have a vergence depth of infinity. In this example, the optical axes of the user's eyes may be substantially parallel to one another such that the distance between the centers of the user's pupils may be roughly equal to the distance between the centers of rotation of the user's left and right eyes.

In some implementations, the vergence depth estimation module 928 may utilize data indicating the estimated centers of the user's pupils (e.g., as provided by module 920) to determine the 3D distance between the estimated centers of the user's pupils. The vergence depth estimation module 928 may obtain a measure of vergence depth by comparing such a determined 3D distance between pupil centers to estimated IPD (e.g., Euclidean distance(s) between estimated 3D positions of centers of rotations).

In addition to the 3D distance between pupil centers and estimated IPD, the vergence depth estimation module 928 may utilize known, assumed, estimated, and/or determined geometries to calculate vergence depth. As an example, module 928 may combine 3D distance between pupil centers, estimated IPD, and 3D CoR positions in a trigonometric calculation to estimate (e.g., determine) a user's vergence depth. In some embodiments, an evaluation of such a determined 3D distance between pupil centers against estimated IPD may serve to indicate a measure of the user's current vergence depth relative to optical infinity. In some examples, the vergence depth estimation module 928 may receive or access data indicating an estimated 3D distance between the estimated centers of the user's pupils for purposes of obtaining such a measure of vergence depth.

In some embodiments, the vergence depth estimation module 928 may estimate vergence depth by comparing a user's left and right optical axis. In particular, vergence depth estimation module 928 may estimate vergence depth by locating the distance from a user at which the user's left and right optical axes intersect (or where projections of the user's left and right optical axes on a plane such as a horizontal plane intersect). Module 928 may utilize a user's IPD in this calculation, by setting the zero depth to be the depth at which the user's left and right optical axes are separated by the user's IPD. In at least some embodiments, vergence depth estimation module 928 may determine vergence depth by triangulating eye tracking data together with known or derived spatial relationships.

In some embodiments, vergence depth estimation module 928 may estimate a user's vergence depth based on the intersection of the user's visual axes in contrast to optical axes as described above. This may provide a more accurate indication of the distance on which the user is focused.

In at least some embodiments, eye tracking module 814a may include optical to visual axis mapping module 930. As discussed in further detail in connection with FIG. 10, a user's optical and visual axis are generally not aligned. A visual axis is the axis along which a person is looking, while an optical axis is defined by the center of that person's lens and pupil, and may go through the center of the person's retina. In particular, a user's visual axis is generally defined by the location of the user's fovea, which may be offset from the center of a user's retina, thereby resulting in different optical and visual axis. In at least some of these embodiments, eye tracking module 814a may include optical to visual axis mapping module 930. Optical to visual axis mapping module 930 may correct for the differences between a user's optical and visual axis and provide information on the user's visual axis to other components in the wearable system, such as vergence depth estimation module 928 and light-field render controller 818.

In some examples, module 930 may use assumed eye dimensions 904 including a typical offset of approximately 5.2° inwards (nasally, towards a user's nose) between an optical axis and a visual axis. In other words, module 930 may shift a user's left optical axis (nasally) rightwards by 5.2° towards the nose and a user's right optical axis (nasally) leftwards by 5.2° towards the nose in order to estimate the directions of the user's left and right optical axes. In other examples, module 930 may utilize per-user calibration data 906 in mapping optical axes (e.g., as indicated by module 922 described above) to visual axes. As additional examples, module 930 may shift a user's optical axes nasally by between 4.0° and 6.5°, by between 4.5° and 6.0°, by between 5.0° and 5.4°, etc., or any ranges formed by any of these values. In some arrangements, the module 930 may apply a shift based at least in part upon characteristics of a particular user such as their age, sex, vision prescription, or other relevant characteristics and/or may apply a shift based at least in part upon a calibration process for a particular user (e.g., to determine a particular user's optical-visual axis offset). In at least some embodiments, module 930 may also shift the origins of the left and right optical axes to correspond with the user's CoP (as determined by module 932) instead of the user's CoR.

Optional center of perspective (CoP) estimation module 932, when provided, may estimate the location of the user's left and right centers of perspective (CoP). A CoP may be a useful location for the wearable system and, in at least some embodiments, is a position just in front of a pupil. In at least some embodiments, CoP estimation module 932 may estimate the locations of a user's left and right centers of perspective based on the 3D location of a user's pupil center, the 3D location of a user's center of cornea curvature, or such suitable data or any combination thereof. As an example, a user's CoP may be approximately 5.01 mm in front of the center of cornea curvature and may be approximately 2.97 mm behind the outer surface of a user's cornea, along the optical or visual axis. The 5.01 mm may represent a distance from the corneal sphere center in a direction that is towards the eye's cornea and that is along the optical axis. A user's center of perspective may be just in front of the center of their pupil. As examples, a user's CoP may be less than approximately 2.0 mm from the user's pupil, less than approximately 1.0 mm from the user's pupil, or less than approximately 0.5 mm from the user's pupil or any ranges between any of these values. As another example, the center of perspective may correspond to a location within the anterior chamber of the eye. As other examples, the CoP may be between 1.0 mm and 2.0 mm, about 1.0 mm, between 0.25 mm and 1.0 mm, between 0.5 mm and 1.0 mm, or between 0.25 mm and 0.5 mm.

The center of perspective described herein (as a potentially desirable position for a pinhole of a render camera and an anatomical position in a user's eye) may be a position that serves to reduce and/or eliminate undesired parallax shifts. In particular, the optical system of a user's eye may be roughly equivalent to a theoretical system formed by a pinhole in front of a lens, projecting onto a screen, with the pinhole, lens, and screen roughly corresponding to a user's pupil/iris, lens, and retina, respectively. Moreover, it may be desirable for there to be little or no parallax shift when two point light sources (or objects) at different distances from the user's eye are rigidly rotated about the opening of the pinhole (e.g., rotated along radii of curvature equal to their respective distance from the opening of the pinhole).

Thus, it would seem that the CoP should be located at the center of the pupil of an eye (and such a CoP may be used in some embodiments). However, the human eye includes, in addition to the lens and pinhole of the pupil, a cornea which imparts additional optical power to light propagating toward the retina). The anatomical equivalent of the pinhole in the theoretical system described in this paragraph may therefore be a region of the user's eye positioned between the outer surface of the cornea of the user's eye and the center of the pupil or iris of the user's eye. For example, the anatomical equivalent of the pinhole may correspond to a region within the anterior chamber of a user's eye. For various reasons discussed herein, it may be desired to set the CoP to such a position within the anterior chamber of the user's eye. The derivation and significance of the CoP are described in in U.S. patent application Ser. No. 16/250,931, which is incorporated by reference herein in its entirety.

As discussed above, eye tracking module 814a may provide data, such as estimated 3D positions of left and right eye centers of rotation (CoR), vergence depth, left and right eye optical axis, 3D positions of a user's eye, 3D positions of a user's left and right centers of cornea curvature, 3D positions of a user's left and right pupil centers, 3D positions of a user's left and right center of perspective, a user's IPD, etc., to other components, such as light-field render controller 818 and registration observer 820, in the wearable system. Eye tracking module 814a may also include other submodules that detect and generate data associated with other aspects of a user's eye. As examples, eye tracking module 814a may include a blink detection module that provides a flag or other alert whenever a user blinks and a saccade detection module that provides a flag or other alert whenever a user's eye saccades (e.g., quickly shifts focus to another point).

Figure 10:
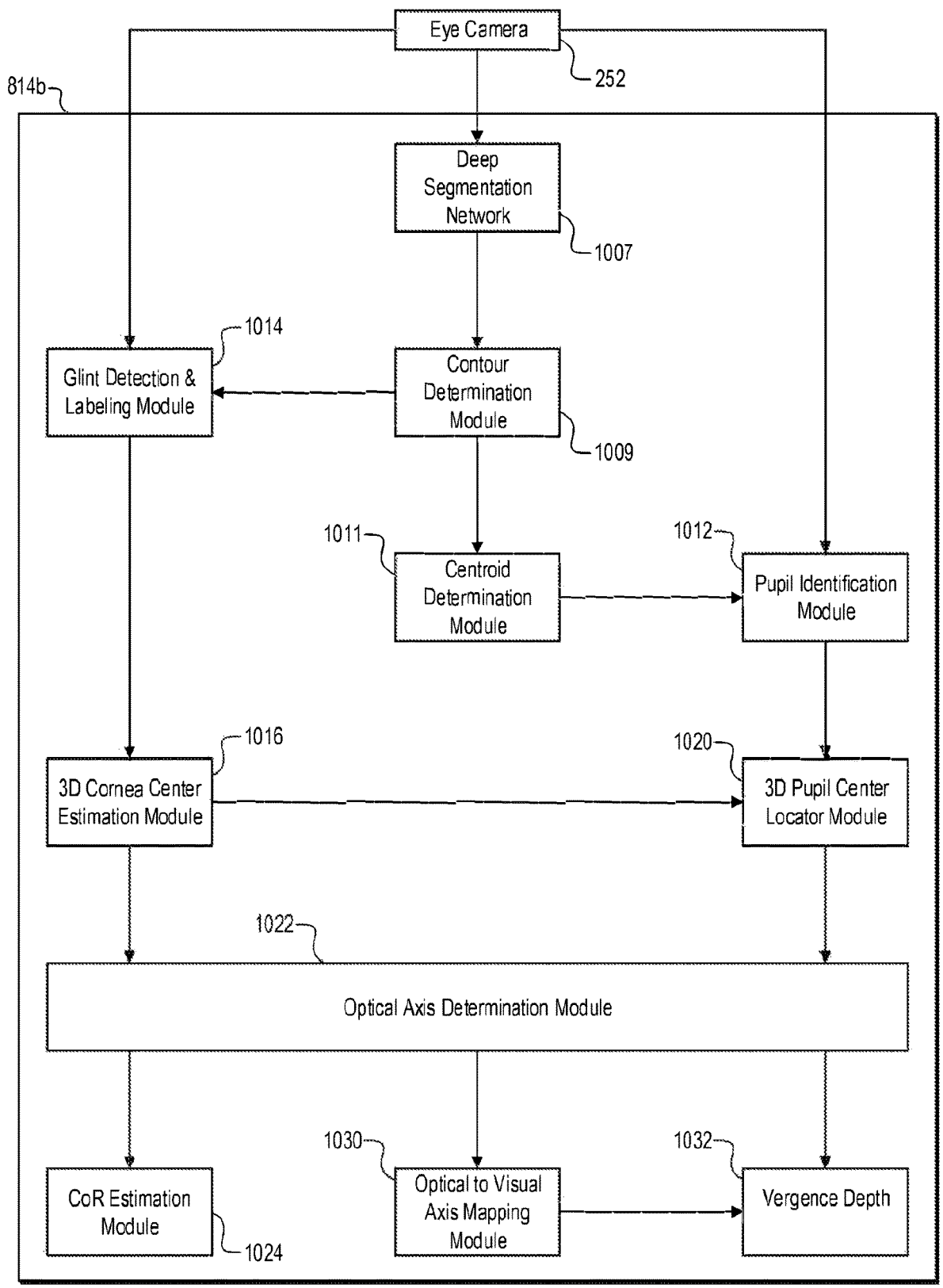
FIG. 10 is a block diagram of a wearable system that may include an eye tracking system.

FIG. 10 illustrates a block diagram of an example eye tracking module 814b. In some implementations, eye tracking module 814b may correspond to eye tracking module 814 of system 800 as described above with reference to FIG. 8. As shown in FIG. 10, eye tracking module 814b may include a variety of different submodules, may provide a variety of different outputs, and may utilize a variety of available data in tracking the user's eyes. More specifically, eye tracking module 814b may include deep segmentation network 1007 (e.g., one or more machine learning models), contour determination module 1009, centroid determination module 1011, pupil identification module 1012, glint detection and labeling module 1014, 3D cornea center estimation module 1016, 3D pupil center locator module 1020, optical axis determination module 1022, CoR estimation module 1024, optical to visual axis mapping module 1030, and vergence depth estimation module 1032. In some implementations, at least some of the operations performed by one or more of submodules 1012, 1014, 1016, 1020, 1022, 1024, 1030, and 1032 in FIG. 10 may correspond to at least some of the operations performed by one or more of submodules 912, 914, 916, 920, 922, 924, 930, and 932 as described above with reference to FIG. 9, respectively. In some examples, eye tracking module 814b may include one or more additional submodules configured to perform one or more of the operations described above with reference to FIG. 9.

In some implementations, the deep segmentation network 1007 may correspond to a neural network or other model trained or otherwise configured to perform one or more of the eye image segmentation operations described above with reference to FIGS. 1A-7B. Example neural networks may include a fully-connected neural network, a convolutional neural network, and so on. As such, the deep segmentation network 1007 may receive images of a user's eye from eye camera 252 as input, and may provide eye image segmentation data as output to contour determination module 1009. The contour determination module 1009 may, for example, identify contours or boundaries of the sclera, iris, and/or pupil of the user's eye based on the eye image segmentation data generated by the deep segmentation network 1007. This information may also be referred to herein as iris segmentation data and/or pupil segmentation data. In some implementations, the contour determination module 1009 may provide data indicating determined contours of the user's iris to the glint detection and labeling module 1014. In addition, the contour determination module 1009 may, in some examples, output data indicating determined contours of the user's pupil to the centroid determination module 1011.

In implementations where data indicating determined contours of the iris is provided as input to the glint detection and labeling module 1014 by the contour determination module 1009, the glint detection and labeling module 1014 may, in some examples, utilize such data to prune the search space for glints. More specifically, in some examples, the glint detection and labeling module 1014 may identify a particular region of a given eye image received from eye camera 252 based on data received from the contour determination module 1009, and search for the presence of glints within the particular region identified. Such a particular region identified may, for example, at least partially correspond to the region of the iris. In some implementations, the glint detection and labeling module 1014 may limit its search for glints to such a region, such that other regions of a given eye image are effectively excluded from the search for eye glints and/or discarded altogether. As such, the glint detection and labeling module 1014 may be able to detect and label glints in a faster and/or less computationally-intensive manner by leveraging data indicating determined contours of the iris as provided by the contour determination module 1009.

As described in more detail below with reference to FIG. 11, in some examples, the glint detection and labeling module 1014 may leverage data indicating determined contours of the iris, as determined by the contour determination module 1009 based on one eye image, to identify a particular region in one or more subsequently-received eye images. In other words, in some examples, the glint detection and labeling module 1014 may identify a particular region in the $n^{th}$ eye image captured by the eye camera 252 based on data indicating determined contours of the iris in the $(n-1)^{th}$ eye image captured by the eye camera 252, as provided by the contour determination module 1009. Given that eye image segmentation can be relatively computationally—and time-intensive, decoupling the operations of submodules 1007, 1009, and 1011 from other submodules of the eye tracking module 814b in this manner may serve to reduce overall system latency.

As mentioned above, in some examples, the contour determination module 1009 may output data indicating determined contours of the user's pupil to the centroid determination module 1011. The centroid determination module 1011 may, in turn, use such data to determine contour moments, center of mass, or centroid of the pupil. In some implementations, the centroid determination module 1011 may provide data indicating the centroid of the user's pupil to the pupil identification module 1012. In such implementations, the pupil identification module 1012 may, in some examples, utilize such data to provide a starting point for identifying the pupil in a given eye image. For example, the pupil identification module 1012 may identify a particular location in a given eye image received from eye camera 252 based on data received from the contour determination module 1009, and search outwards from the identified location for the presence of pupil boundaries (e.g., using the starburst algorithm).

In examples where the starburst algorithm is employed, the pupil identification module 1012 may use the above-described identified location as the location from which a starburst is initiated (e.g., the origin of the burst). And, as described in more detail below with reference to FIG. 11, in some examples, the pupil identification module 1012 may leverage data indicating the determined centroid of the pupil, as determined by the centroid determination module 1011 based on one eye image, to identify a particular location in one or more subsequently-received eye images. In other words, in some examples, the pupil identification module 1012 may identify a particular location in the $n^{th}$ eye image captured by the eye camera 252 based on data indicating the determined centroid of the pupil in the $(n-1)^{th}$ eye image captured by the eye camera 252, as provided by the centroid determination module 1011. In such examples, the pupil identification module 1012 may subsequently search outwards from the particular location identified in the $n^{th}$ eye image for the presence/locations of pupil boundaries in the $n^{th}$ eye image (e.g., using the starburst algorithm). As mentioned above, latency savings can be achieved by decoupling the operations of submodules 1007, 1009, and 1011 from other submodules of the eye tracking module 814b in this manner.

Figure 11:
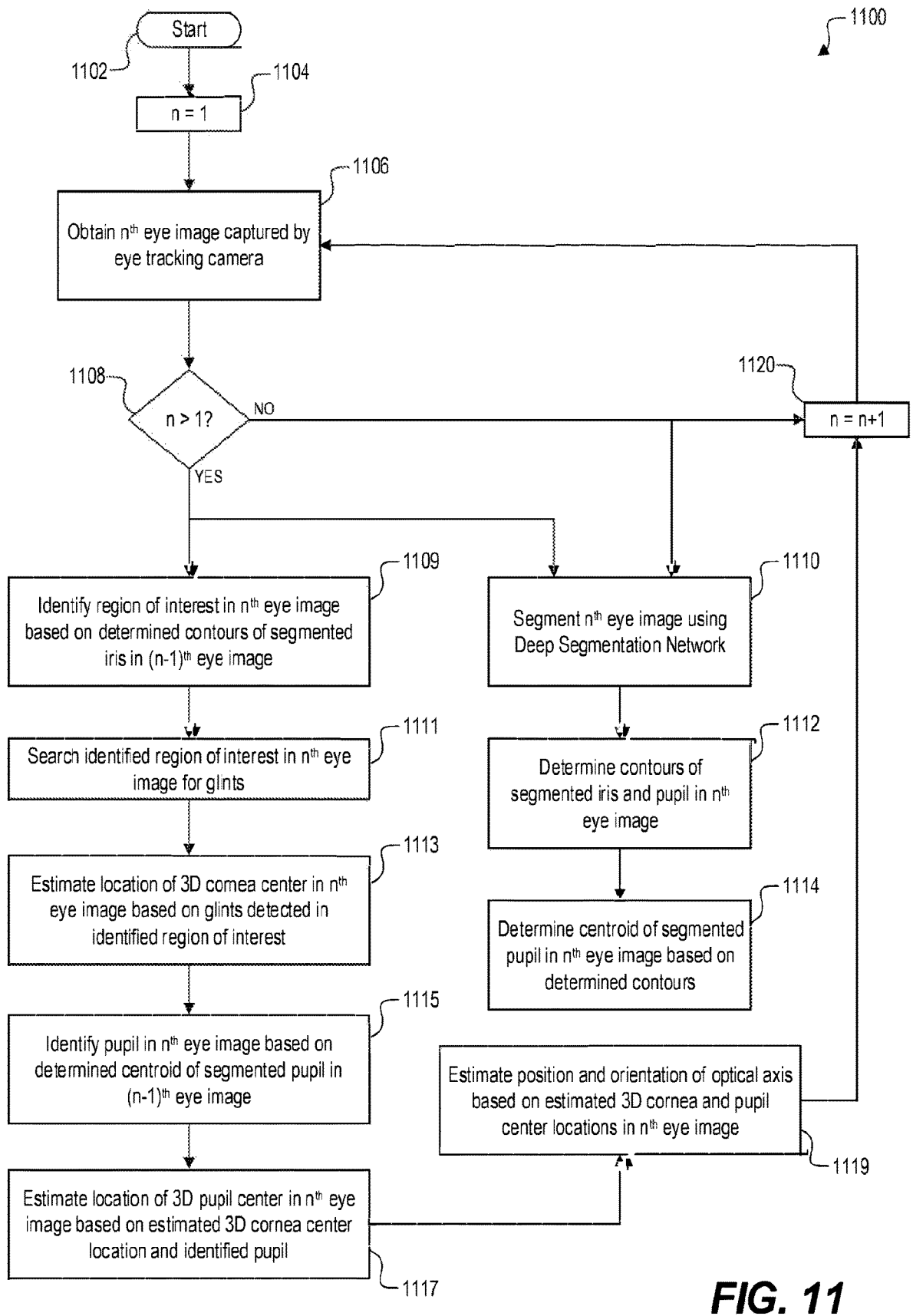
FIG. 11 is a flowchart that illustrates an example process for performing eye tracking with reduced latency.

FIG. 11 is a flowchart that illustrates an example process 1100 for performing eye tracking with reduced latency. The process 1100 can be performed by embodiments of the wearable display system described herein, for example, using the eye tracking module 814b described above with reference to FIG. 10. In various implementations of the process 1100, the blocks described below can be performed in any suitable order or sequence, and blocks can be combined or rearranged, or other blocks can be added.

In some implementations, the process 1100 may be performed by a head-mounted system that includes one or more cameras that are configured to capture images of an eye of a user, multiple light sources (e.g., infrared light sources) that are configured to illuminate the eye of the user in a manner so as to produce glints in images of the eye of the user captured by the one or more cameras, and one or more processors coupled to the one or more cameras. In at least some of such implementations, some or all of the operations of process 1100 may be performed at least in part by the one or more processors of the system.

At blocks 1102 through 1106 (e.g., blocks 1102, 1104, and 1106), the process 1100 may begin with obtaining the first eye image captured by an eye tracking camera. This may, as an example, correspond to one or more submodules of eye tracking module 814b obtaining an image of a user's eye from the eye tracking camera 252 at the beginning of a new eye tracking session. Such a new eye tracking session may, for example, be initiated responsive to the HMD being turned on or launching a particular application.

At block 1108, the process 1100 includes determining whether the eye image obtained at block 1106 represents the first eye image captured and obtained following the initiation of process 1100 at block 1102. Given that, in this instance, the operations of block 1108 are performed immediately following those of blocks 1102 through 1106, the process 1100 may, in this instance, include determining that the eye image obtained at block 1106 does represent the first eye image captured and obtained following the initiation of process 1100 at block 1102. As such, in this instance, the process 1100 may proceed to blocks 1110 and 1120. In some implementations, the process 1100 may include proceeding to blocks 1110 and 1120 simultaneously.

At block 1110, the process 1100 may include segmenting the first eye image using a Deep Segmentation Network. This may, for example, correspond to the deep segmentation network 1007 of the eye tracking module 814b, as described above with reference to FIG. 10, segmenting an eye image using one or more of the techniques described above with reference to FIGS. 1A-7B.

At block 1112, the process 1100 may include determining contours of the segmented iris and pupil in the first eye image. This may, for example, correspond to the contour determination module 1009 of the eye tracking module 814b, as described above with reference to FIG. 10, identifying the contours of the iris and pupil in an eye image based on data generated by the deep segmentation network 1007.

At block 1114, the process 1100 may include determining the centroid of the segmented pupil in the first eye image based on the determined contours of the segmented pupil. This may, as an example, correspond to the centroid determination module 1011 of the eye tracking module 814b, as described above with reference to FIG. 10, determining the contour moments, center of mass, or centroid of the segmented pupil in an eye image based on data provided by the contour determination module 1009.

At blocks 1120 and 1108, the process 1100 may include obtaining the second eye image captured by the eye tracking camera. As mentioned above, in some implementations, the operations associated with blocks 1120 and 1108 may be performed at the same time as one or more of the operations associated with blocks 1110 through 1114. At block 1108, the process 1100 includes determining whether the eye image obtained at block 1106 represents the first eye image captured and obtained following the initiation of process 1100 at block 1102. Given that, in this instance, the operations of block 1108 may be performed following those of blocks 1120 and 1106 (e.g., immediately following), the process 1100 may, in this instance, include determining that the latest eye image obtained does not represent the first eye image captured and obtained following the initiation of process 1100 at block 1102. As such, in this instance, the process 1100 may proceed to blocks 1109 and 1110. In some implementations, the process 1100 may include proceeding to blocks 1109 and 1110 simultaneously.

At block 1109, the process 1100 may include identifying a region of interest in the second eye image based on the determined contours of the segmented iris in the first eye image. This may, as an example, correspond to the glint detection and labeling module 1014 of the eye tracking module 814b. As described above with reference to FIG. 10, this may include identifying a region of a given eye image within which to search for glints using data generated by the contour determination module 1009 on the basis of the segmentation of the previous eye image. Given that relatively little eye movement is likely to occur between consecutive eye images, iris contours determined on the basis of the segmentation of the first eye image may be adequately informative of the boundaries of the iris in the second eye image for the purposes of glint detection.

At block 1111, the process 1100 may include searching the identified region of interest in the second image for glints. For example, one or more locations (e.g., a set of locations) in the second image may be detected as representing glints. As described above, bright regions within the second image may be identified (e.g., blobs) or local intensity maxima. In some embodiments, a location of a glint may be identified as being a local intensity maxima in two image dimensions (e.g., an X and Y position in the second image). In these embodiments, and as an example, Gaussian distributions may be determined for a glint via determining a maxima intensity value within a bounding box surrounding an estimated glint. The image location corresponding to the maxima intensity value may be assigned as the glint location. The estimated glint may be determined based on an increase in image intensity (e.g., brightness) as compared to another portion of the second image.

The operations associated with block 1111 may also correspond to those performed by the glint detection and labeling module 1014 of the eye tracking module 814b, as described above with reference to FIG. 10.

At block 1113, the process 1100 may include estimating a location of the 3D cornea center in the second eye image based on glints detected in the identified region of interest. This may, as an example, correspond to the 3D cornea center module 1016 of the eye tracking module 814b. As described above with reference to FIG. 10, this may include estimating a location of the 3D cornea center in a given eye image based on data provided by the glint detection and labeling module 1014.

At block 1115, the process 1100 may include identifying the pupil in the second image based on the determined centroid of the segmented pupil in the first eye image. This may, as an example, correspond to the pupil identification module 1012 of the eye tracking module 814b. As described above with reference to FIG. 10, this may include identifying the pupil in a given eye image using data generated by the centroid determination module 1011 on the basis of the segmentation of the previous eye image and the determined contours thereof. Given that relatively little eye movement is likely to occur between consecutive eye images, a pupil centroid determined on the basis of the segmentation of the first eye image may be adequately informative of the centroid of the pupil in the second eye image for the purposes of pupil identification. Indeed, as long as the pupil centroid determined on the basis of the segmentation of the first eye image falls somewhere within the region of the pupil in the second eye image, then the outer boundaries of the pupil in the second eye image may be identified (e.g., using the starburst algorithm) with a sufficiently high degree of accuracy. In some implementations, the operations associated with block 1115 may be performed in parallel with the operations associated with blocks 1109 through 1113. In some examples, one or more of the operations associated with block 1115 may be performed prior to one or more of the operations associated with blocks 1109 through 1113.

At block 1117, the process 1100 may include estimating a location of the 3D pupil center in the second eye image based on the estimated location of the 3D cornea center in the second eye image and the pupil as identified in the first eye image. This may, as an example, correspond to the 3D pupil center locator module 1020 of the eye tracking module 814b. As described above with reference to FIG. 10, this may include estimating a location of the 3D cornea center in a given eye image using data provided by the 3D cornea center module 1016 and data provided by the pupil identification module 1012.

At block 1119, the process 1100 may include estimating the position and orientation of the optical axis of the eye in the second eye image based on the estimated 3D cornea and pupil center locations in the second eye image. This may, as an example, correspond to the optical axis determination module 1022 of the eye tracking module 814b. As described above with reference to FIG. 10, this may include determining the position and orientation of the optical axis of the eye in a given eye image based on data provided by the 3D cornea center estimation module 1016 and data provided by the 3D pupil center locator module 1020.

The process 1100 may then proceed to blocks 1120 and 1106 to obtain and subsequently process the next eye image (e.g., third eye image) captured by the eye tracking camera. In some implementations, the process 1100 may then proceed to blocks 1120 and 1106 prior to completion of one or more of the operations associated with blocks 1117 and/or 1119.

Performance of the process 1100 may, in some examples, continue for the duration of an eye tracking session. As such, from the second eye image onward, the operations associated with blocks 1109, 1111, 1113, 1115, 1117, and 1119 may be applied to the most recently obtained eye image (e.g., the $n^{th}$ eye image) using data generated on the basis of the segmentation of the previously obtained eye image (e.g., the $(n-1)^{th}$ eye image). In this way, a system performing the operations of process 1100 need not wait for segmentation operations to be completed before obtaining and processing the next eye image. This may serve to effectively reduce latency. In some implementations, the operations associated with blocks 1109, 1111, 1113, 1115, 1117, and 1119 may use the latest segmentation data (e.g., data generated by one or more of submodules 1007, 1009, and 1011) available. As such, in cases where additional and/or more powerful computational resources are available to a system configured to execute the operations of process 1100, the operations associated with blocks 1109, 1111, 1113, 1115, 1117, and 1119 may be applied to the $n^{th}$ eye image using segmentation data generated on the basis of the $n^{th}$ eye image.

Similarly, in cases where relatively large computational loads are placed on a system configured to execute the operations of process 1100, the operations associated with blocks 1109, 1111, 1113, 1115, 1117, and 1119 may be applied to the $n^{th}$ eye image using the freshest segmentation data available (e.g., most recent segmentation data), which could, For example, be data generated on the basis of the $(n-1)^{th}$ eye image, the $(n-2)^{th}$ eye image, the $(n-3)^{th}$ eye image, and so on. Thus, data generated based on the second or first image may be used for the third image.

In some implementations, the process 1100 may include one or more additional operations corresponding to operations of one or more other submodules of eye tracking modules 814a and 814b, as described above with reference to FIGS. 9 and 10.

In at least some implementations in which the operations associated with blocks 1109, 1111, 1113, 1115, 1117, and 1119 use the latest segmentation data available, the operations associated with blocks 1110, 1112, and 1114 may not necessarily be performed for every eye image obtained. For example, the operations associated with blocks 1110, 1112, and 1114 may be performed for every other eye image obtained. In such examples, the operations associated with blocks 1109, 1111, 1113, 1115, 1117, and 1119 may, however, be performed for every eye image obtained. In this way, the operations associated with blocks 1110, 1112, and 1114 may, for example, be performed at a first frequency, while the operations associated with blocks 1109, 1111, 1113, 1115, 1117, and 1119 may be performed at a second frequency that is a multiple of the first frequency (e.g., two times that of the first frequency). For example, in some examples, the operations associated with blocks 1109, 1111, 1113, 1115, 1117, and 1119 may be performed for every eye image obtained at a rate of 60 Hz, while the operations associated with blocks 1110, 1112, and 1114 may be performed for every other eye image obtained at a rate of 30 Hz. In some embodiments, the operations associated with blocks 1110, 1112, and 1114 may be performed for every other eye image obtained, every third eye image obtained, every fourth eye image obtained, or at some other interval. Other configurations are possible.

EXAMPLES

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Examples of embodiments described herein include at least the following examples below:

Example 1: A head-mounted system comprising: a camera configured to capture images of an eye of a user; one or more light source configured to illuminate the eye of the user, such that glints are represented in images of the eye of user; and one or more processors configured to: obtain a first image of the eye of the user from the camera; provide the first image as input to a machine learning model which has been trained to generate iris segmentation data and pupil segmentation data given an image of an eye; obtain a second image of the eye of the user from the camera subsequent to the first image; detect, based on the iris segmentation data, a set of one or more locations in the second image at which one or more glints are represented; identify, based on the pupil segmentation data, a region of the second image at which the pupil of the eye of the user is represented; and determine a pose of the eye of the user based at least in part on the detected set of one or more glint locations in the second image and the identified region of the second image.

Example 2: The system of Example 1, wherein the one or more processors are further configured to: obtain, via the machine learning model, iris segmentation data and pupil segmentation data for the second image; obtain a third image of the eye of the user from the camera; detect a set of one or more locations in the third image at which one or more glints are shown, respectively, based on the iris segmentation data generated by the machine learning model for the second image; identify a region of the third image at which the pupil of the eye of the user is represented based on the pupil segmentation data generated by the machine learning model for the second image; and determine a pose of the eye of the user based at least in part on the detected set of one or more glint locations in the third image and the identified region of the third image.

Example 3: The system of Example 1, wherein the one or more processors are further configured to: identify a second region of the second image based on the iris segmentation data, and wherein to detect the set of one or more locations in the second image at which one or more glints are shown, the one or more processors are configured to: search the second region of the second image for respective locations exhibiting local maxima intensity values in the second region.

Example 4: The system of Example 3, wherein the one or more processors are further configured to: refrain from searching regions of the second image outside of the particular region for a set of one or more locations at which one or more glints are shown.

Example 5: The system of Example 3, wherein the one or more processors are further configured to: identify contours of the iris of the eye of the user in the first image based on the iris segmentation data, and wherein to identify the different region of the second image based on the iris segmentation data, the one or more processors are configured to: identify a third region of the second image based on the identified contours of the iris of the eye of the user in the first image.

Example 6: The system of Example 1, wherein the one or more processors are further configured to: identify a centroid of the pupil of the eye of the user in the first image based on the pupil segmentation data, and wherein to identify the region of the second image, the one or more processors are configured to: identify a second region of the second image at which the pupil of the eye of the user is represented based on the identified centroid of the pupil of the eye of the user in the first image.

Example 7: The system of Example 6, wherein to identify the second region of the second image, the one or more processors are configured to: identify a location within the second image based on the identified centroid of the pupil of the eye of the user in the first image; and search from the location identified within the second image for pupillary boundaries.

Example 8: The system of Example 7, wherein to search from the location identified within the second image for pupillary boundaries, the one or more processors are configured to: perform a starburst pupil detection process based on the location identified within the second image being assigned as a starting point.

Example 9: The system of Example 1, wherein to determine the pose of the eye of the user based at least in part on the detected set of one or more glint locations in the second image and the identified region of the second image, the one or more processors are configured to: obtain a position and orientation estimate of an optical axis the user's eye based at least in part on the detected set of one or more glint locations in the second image and the identified region of the second image.

Example 10: The system of Example 1, wherein the one or more processors are further configured to: obtain an estimate of a three-dimensional location of a cornea of the user's eye in the second image based on the detected set of one or more glint locations in the second image, and wherein to determine the pose of the eye of the user, the one or more processors are configured to: determine the pose based at least in part on the estimated location of the cornea of the user's eye in the second image and the identified region of the second image.

Example 11: The system of Example 10, wherein the one or more processors are further configured to: obtain an estimate of a three-dimensional location of a pupil of the user's eye in the second image based on the estimated location of the cornea of the user's eye in the second image and the identified region of the second image, and wherein to determine the pose of the eye of the user, the one or more processors are configured to: determine the pose based at least in part on the estimated location of the cornea of the user's eye in the second image and the estimated location of the pupil of the user's eye in the second image.

Example 12: The system of Example 1, wherein the one or more processors are further configured to: obtain a third image of the eye of the user; detect a set of one or more locations in the third image at which one or more glints are represented, respectively, based on iris segmentation data most recently generated by the machine learning model; identify a region of the third image at which the pupil of the eye of the user is shown based on pupil segmentation data most recently generated by the machine learning model; and determine a second pose of the eye of the user based at least in part on the detected set of one or more glint locations in the third image and the identified region of the third image.

Example 13: The system of Example 12, wherein the iris and pupil segmentation data most recently generated by the machine learning model comprises iris and pupil segmentation data generated by the machine learning model for the second image.

Example 14: The system of Example 12, wherein the iris and pupil segmentation data most recently generated by the machine learning model comprises iris and pupil segmentation data generated by the machine learning model for the first image.

Example 15: The system of Example 12, wherein the one or more processors are further configured to: provide the second image as input to the machine learning model, and wherein the iris and pupil segmentation data most recently generated by the machine learning model comprises iris and pupil segmentation data generated by the machine learning model for the third image.

Example 16: The system of Example 12, wherein the one or more processors are further configured to refrain from providing the second image as input to the machine learning model.

Example 17: A method implemented by a head-mounted system of one or more processors, the head-mounted system configured to illuminate an eye of a user such that glints are represented in images of the eye, wherein the method comprises: obtain a first image of the eye of the user; provide the first image as input to a machine learning model which has been trained to generate iris and pupil segmentation data given an image of an eye; obtain a second image of the eye of the user; detect, based on the iris segmentation data, a set of one or more locations in the second image at which one or more glints are represented; identify, based on the pupil segmentation data, a region of the second image at which the pupil of the eye of the user is represented; and determine a pose of the eye of the user based at least in part on the detected set of one or more glint locations in the second image and the identified region of the second image.

Example 18: The method of Example 17, further comprising: obtaining, via the machine learning model, iris and pupil segmentation data for the second image; obtaining a third image of the eye of the user; detecting a set of one or more locations in the third image at which one or more glints are shown, respectively, based on the iris segmentation data generated by the machine learning model for the second image; identifying a region of the third image at which the pupil of the eye of the user is represented based on the pupil segmentation data generated by the machine learning model for the second image; and determining a pose of the eye of the user based at least in part on the detected set of one or more glint locations in the third image and the identified region of the third image.

Example 19: The method of Example 17, further comprising: identifying a second region of the second image based on the iris segmentation data, and wherein to detect the set of one or more locations in the second image at which one or more glints are shown, the method further comprises: search the second region of the second image for respective locations exhibiting local maxima intensity values in the second region.

Example 20: The method of Example 19, wherein the head-mounted system is configured to refrain from searching regions of the second image outside of the particular region for a set of one or more locations at which one or more glints are shown.

Example 21: The method of Example 19, further comprising: identifying contours of the iris of the eye of the user in the first image based on the iris segmentation data, and wherein to identify the different region of the second image based on the iris segmentation data, the method further comprises: identifying a third region of the second image based on the identified contours of the iris of the eye of the user in the first image.

Example 22: The method of Example 17, further comprising: identifying a centroid of the pupil of the eye of the user in the first image based on the pupil segmentation data, and wherein to identify the region of the second image, the method further comprises: identifying a second region of the second image at which the pupil of the eye of the user is represented based on the identified centroid of the pupil of the eye of the user in the first image.

Example 23: The method of Example 22, wherein to identify the second region of the second image, the method comprises: identifying a location within the second image based on the identified centroid of the pupil of the eye of the user in the first image; and searching from the location identified within the second image for pupillary boundaries.

Example 24: The method of Example 23, wherein to search from the location identified within the second image for pupillary boundaries, the method comprises: performing a starburst pupil detection process based on the location identified within the second image being assigned as a starting point.

Example 25: The method of Example 17, wherein to determine the pose of the eye of the user based at least in part on the detected set of one or more glint locations in the second image and the identified region of the second image, the method comprises: obtaining a position and orientation estimate of an optical axis the user's eye based at least in part on the detected set of one or more glint locations in the second image and the identified region of the second image.

Example 26: The method of Example 17, wherein the method further comprises: obtaining an estimate of a three-dimensional location of a cornea of the user's eye in the second image based on the detected set of one or more glint locations in the second image, and wherein to determine the pose of the eye of the user, the method comprises: determining the pose based at least in part on the estimated location of the cornea of the user's eye in the second image and the identified region of the second image.

Example 27: The method of Example 26, wherein the method further comprises: obtaining an estimate of a three-dimensional location of a pupil of the user's eye in the second image based on the estimated location of the cornea of the user's eye in the second image and the identified region of the second image, and wherein to determine the pose of the eye of the user, the method comprises: determining the pose based at least in part on the estimated location of the cornea of the user's eye in the second image and the estimated location of the pupil of the user's eye in the second image.

Example 28: The method of Example 17, wherein the method further comprises: obtaining a third image of the eye of the user; detecting a set of one or more locations in the third image at which one or more glints are represented, respectively, based on iris segmentation data most recently generated by the machine learning model; identifying a region of the third image at which the pupil of the eye of the user is shown based on pupil segmentation data most recently generated by the machine learning model; and determining a second pose of the eye of the user based at least in part on the detected set of one or more glint locations in the third image and the identified region of the third image.

Example 29: The method of Example 28, wherein the iris and pupil segmentation data most recently generated by the machine learning model comprises iris and pupil segmentation data generated by the machine learning model for the second image.

Example 30: The method of Example 28, wherein the iris and pupil segmentation data most recently generated by the machine learning model comprises iris and pupil segmentation data generated by the machine learning model for the first image.

Example 31: The method of Example 28, wherein the method further comprises: providing the second image as input to the machine learning model, and wherein the iris and pupil segmentation data most recently generated by the machine learning model comprises iris and pupil segmentation data generated by the machine learning model for the third image.

Example 32: The method of Example 28, wherein the head-mounted system is configured to refrain from providing the second image as input to the machine learning model.

Example 33: A head-mounted system comprising: a camera configured to capture images of an eye of a user; a plurality of light sources configured to illuminate the eye of the user in a manner so as to produce glints in images of the eye of user captured by the camera; and one or more processors operatively coupled to the camera, the one or more processors configured to: obtain a first image of the eye of the user from the camera; provide the first image as input to a neural network that has been trained to generate iris and pupil segmentation data given an image of an eye; obtain a second image of the eye of the user from the camera, the second image captured by the camera immediately following the first image; detect a set of one or more locations in the second image at which one or more glints are shown, respectively, based on iris segmentation data generated by the neural network for the first image; identify a region of the second image at which the pupil of the eye of the user is shown based on pupil segmentation data generated by the neural network for the first image; and determine a pose of the eye of the user based at least in part on the detected set of one or more glint locations in the second image and the identified region of the second image.

Example 34: The system of Example 33, wherein the one or more processors are further configured to: provide the second image as input to the neural network; obtain a third image of the eye of the user from the camera, the third image captured by the camera immediately following the second image; detect a set of one or more locations in the third image at which one or more glints are shown, respectively, based on iris segmentation data generated by the neural network for the second image; identify a region of the third image at which the pupil of the eye of the user is shown based on pupil segmentation data generated by the neural network for the second image; and determine a pose of the eye of the user based at least in part on the detected set of one or more glint locations in the third image and the identified region of the third image.

Example 35: The system of Example 33, wherein the one or more processors are further configured to: identify a particular region of the second image based on iris segmentation data generated by the neural network for the first image, and wherein to detect the set of one or more locations in the second image at which one or more glints are shown, respectively, based on iris segmentation data generated by the neural network for the first image, the one or more processors are configured to: search the particular region of the second image for a set of one or more locations at which one or more glints are shown.

Example 36: The system of Example 35, wherein the one or more processors are further configured to: refrain from searching regions of the second image outside of the particular region for a set of one or more locations at which one or more glints are shown.

Example 37: The system of Example 35, wherein the one or more processors are further configured to: identify contours of the iris of the eye of the user in the first image based on iris segmentation data generated by the neural network for the first image, and wherein to identify the particular region of the second image based on iris segmentation data generated by the neural network for the first image, the one or more processors are configured to: identify a particular region of the second image based on the identified contours of the iris of the eye of the user in the first image.

Example 38: The system of Example 33, wherein the one or more processors are further configured to: identify a centroid of the pupil of the eye of the user in the first image based on pupil segmentation data generated by the neural network for the first image, and wherein to identify the region of the second image at which the pupil of the eye of the user is shown based on pupil segmentation data generated by the neural network for the first image, the one or more processors are configured to: identify a region of the second image at which the pupil of the eye of the user is shown based on the identified centroid of the pupil of the eye of the user in the first image.

Example 39: The system of Example 38, wherein to identify the region of the second image at which the pupil of the eye of the user is shown based on the identified centroid of the pupil of the eye of the user in the first image, the one or more processors are configured to: identify a location within the second image based on the identified centroid of the pupil of the eye of the user in the first image; and search outwards from the location identified within the second image for pupillary boundaries.

Example 40: The system of Example 39, wherein to search outwards from the location identified within the second image for pupillary boundaries, the one or more processors are configured to: utilize the location identified within the second image as a starting point in a starburst pupil detection routine.

Example 41: The system of Example 33, wherein to determine the pose of the eye of the user based at least in part on the detected set of one or more glint locations in the second image and the identified region of the second image, the one or more processors are configured to: obtain a position and orientation estimate of an optical axis the user's eye based at least in part on the detected set of one or more glint locations in the second image and the identified region of the second image.

Example 42: The system of Example 33, wherein the one or more processors are further configured to: obtain an estimate of a three-dimensional location of a cornea of the user's eye in the second image based on the detected set of one or more glint locations in the second image, and wherein to determine the pose of the eye of the user based at least in part on the detected set of one or more glint locations in the second image and the identified region of the second image, the one or more processors are configured to: determine a pose of the eye of the user based at least in part on the estimated location of the cornea of the user's eye in the second image and the identified region of the second image.

Example 43: The system of Example 42, wherein the one or more processors are further configured to: obtain an estimate of a three-dimensional location of a pupil of the user's eye in the second image based on the estimated location of the cornea of the user's eye in the second image and the identified region of the second image, and wherein to determine the pose of the eye of the user based at least in part on the estimated location of the cornea of the user's eye in the second image and the identified region of the second image, the one or more processors are configured to: determine a pose of the eye of the user based at least in part on the estimated location of the cornea of the user's eye in the second image and the estimated location of the pupil of the user's eye in the second image.

Example 44: The system of Example 33, wherein the one or more processors are further configured to: obtain a third image of the eye of the user from the camera, the third image captured by the camera immediately following the second image; detect a set of one or more locations in the third image at which one or more glints are shown, respectively, based on iris segmentation data most recently generated by the neural network; identify a region of the third image at which the pupil of the eye of the user is shown based on pupil segmentation data most recently generated by the neural network; and determine a pose of the eye of the user based at least in part on the detected set of one or more glint locations in the third image and the identified region of the third image.

Example 45: The system of Example 44, wherein the iris and pupil segmentation data most recently generated by the neural network comprises iris and pupil segmentation data generated by the neural network for the second image.

Example 46: The system of Example 44, wherein the iris and pupil segmentation data most recently generated by the neural network comprises iris and pupil segmentation data generated by the neural network for the first image.

Example 47: The system of Example 44, wherein the one or more processors are further configured to: provide the second image as input to the neural network, and wherein the iris and pupil segmentation data most recently generated by the neural network comprises iris and pupil segmentation data generated by the neural network for the third image.

Example 48: The system of Example 44, wherein the one or more processors are further configured to refrain from providing the second image as input to the neural network.

As noted above, implementations of the described examples provided above may include hardware, a method or process, and/or computer software on a computer-accessible medium.

ADDITIONAL CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task, eye shape model, or biometric application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head-mounted system comprising:
a camera configured to capture images of an eye of a user;
one or more light source configured to illuminate the eye of the user, such that glints are represented in images of the eye of user; and
one or more processors configured to:
obtain a first image of the eye of the user from the camera;
provide the first image as input to a machine learning model which has been trained to generate iris segmentation data and pupil segmentation data given an image of an eye;
obtain a second image of the eye of the user from the camera subsequent to the first image;
detect, based on the iris segmentation data, a set of one or more locations in the second image at which one or more glints are represented;
identify, based on the pupil segmentation data, a region of the second image at which the pupil of the eye of the user is represented;
determine a pose of the eye of the user based at least in part on the detected set of one or more glint locations in the second image and the identified region of the second image;
obtain, via the machine learning model, iris segmentation data and pupil segmentation data for the second image;
obtain a third image of the eye of the user from the camera;
detect a set of one or more locations in the third image at which one or more glints are shown, respectively, based on the iris segmentation data generated by the machine learning model for the second image;
identify a region of the third image at which the pupil of the eye of the user is represented based on the pupil segmentation data generated by the machine learning model for the second image; and
determine a pose of the eye of the user based at least in part on the detected set of one or more glint locations in the third image and the identified region of the third image.

2. The system of claim 1, wherein the one or more processors are further configured to:
identify a second region of the second image based on the iris segmentation data, and
wherein to detect the set of one or more locations in the second image at which one or more glints are shown, the one or more processors are configured to:
search the second region of the second image for respective locations exhibiting local maxima intensity values in the second region.

3. The system of claim 1, wherein the one or more processors are further configured to:
identify a centroid of the pupil of the eye of the user in the first image based on the pupil segmentation data, and
wherein to identify the region of the second image, the one or more processors are configured to:
identify a second region of the second image at which the pupil of the eye of the user is represented based on the identified centroid of the pupil of the eye of the user in the first image.

4. The system of claim 3, wherein to identify the second region of the second image, the one or more processors are configured to:
identify a location within the second image based on the identified centroid of the pupil of the eye of the user in the first image; and search from the location identified within the second image for pupillary boundaries.

5. The system of claim 1, wherein to determine the pose of the eye of the user based at least in part on the detected set of one or more glint locations in the second image and the identified region of the second image, the one or more processors are configured to:
obtain a position and orientation estimate of an optical axis of the user's eye based at least in part on the detected set of one or more glint locations in the second image and the identified region of the second image.

6. The system of claim 1, wherein the one or more processors are further configured to:
obtain an estimate of a three-dimensional location of a cornea of the user's eye in the second image based on the detected set of one or more glint locations in the second image, and
wherein to determine the pose of the eye of the user, the one or more processors are configured to:
determine the pose based at least in part on the estimated location of the cornea of the user's eye in the second image and the identified region of the second image.

7. The system of claim 6, wherein the one or more processors are further configured to:
obtain an estimate of a three-dimensional location of a pupil of the user's eye in the second image based on the estimated location of the cornea of the user's eye in the second image and the identified region of the second image, and
wherein to determine the pose of the eye of the user, the one or more processors are configured to:
determine the pose based at least in part on the estimated location of the cornea of the user's eye in the second image and the estimated location of the pupil of the user's eye in the second image.

8. A method implemented by a head-mounted system of one or more processors, the head-mounted system configured to illuminate an eye of a user such that glints are represented in images of the eye, wherein the method comprises:
obtain a first image of the eye of the user;
provide the first image as input to a machine learning model which has been trained to generate iris and pupil segmentation data given an image of an eye;
obtain a second image of the eye of the user;
detect, based on the iris segmentation data, a set of one or more locations in the second image at which one or more glints are represented;
identify, based on the pupil segmentation data, a region of the second image at which the pupil of the eye of the user is represented;
determine a pose of the eye of the user based at least in part on the detected set of one or more glint locations in the second image and the identified region of the second image;
obtaining, via the machine learning model, iris and pupil segmentation data for the second image;
obtaining a third image of the eye of the user;
detecting a set of one or more locations in the third image at which one or more glints are shown, respectively, based on the iris segmentation data generated by the machine learning model for the second image;
identifying a region of the third image at which the pupil of the eye of the user is represented based on the pupil segmentation data generated by the machine learning model for the second image; and
determining a pose of the eye of the user based at least in part on the detected set of one or more glint locations in the third image and the identified region of the third image.

9. The method of claim 8, further comprising:
identifying a second region of the second image based on the iris segmentation data, and
wherein to detect the set of one or more locations in the second image at which one or more glints are shown, the method further comprises:
search the second region of the second image for respective locations exhibiting local maxima intensity values in the second region.

10. The method of claim 8, further comprising:
identifying a centroid of the pupil of the eye of the user in the first image based on the pupil segmentation data, and
wherein to identify the region of the second image, the method further comprises:
identifying a second region of the second image at which the pupil of the eye of the user is represented based on the identified centroid of the pupil of the eye of the user in the first image.

11. The method of claim 10, wherein to identify the second region of the second image, the method comprises:
identifying a location within the second image based on the identified centroid of the pupil of the eye of the user in the first image; and
searching from the location identified within the second image for pupillary boundaries.

12. The method of claim 8, wherein to determine the pose of the eye of the user based at least in part on the detected set of one or more glint locations in the second image and the identified region of the second image, the method comprises:
obtaining a position and orientation estimate of an optical axis of the user's eye based at least in part on the detected set of one or more glint locations in the second image and the identified region of the second image.

13. The method of claim 8, wherein the method further comprises:
obtaining an estimate of a three-dimensional location of a cornea of the user's eye in the second image based on the detected set of one or more glint locations in the second image, and
wherein to determine the pose of the eye of the user, the method comprises:
determining the pose based at least in part on the estimated location of the cornea of the user's eye in the second image and the identified region of the second image.

14. The method of claim 13, wherein the method further comprises:
obtaining an estimate of a three-dimensional location of a pupil of the user's eye in the second image based on the estimated location of the cornea of the user's eye in the second image and the identified region of the second image, and
wherein to determine the pose of the eye of the user, the method comprises:
determining the pose based at least in part on the estimated location of the cornea of the user's eye in the second image and the estimated location of the pupil of the user's eye in the second image.

15. Non-transitory computer storage media storing instructions that when executed by a head-mounted system of one or more processors, cause the one or more processors to:
- obtain a first image of the eye of the user from a camera of the head-mounted system;
- provide the first image as input to a machine learning model which has been trained to generate iris segmentation data and pupil segmentation data given an image of an eye;
- obtain a second image of the eye of the user from the camera subsequent to the first image;
- detect, based on the iris segmentation data, a set of one or more locations in the second image at which one or more glints are represented;
- identify, based on the pupil segmentation data, a region of the second image at which the pupil of the eye of the user is represented;
- determine a pose of the eye of the user based at least in part on the detected set of one or more glint locations in the second image and the identified region of the second image;
- obtain, via the machine learning model, iris segmentation data and pupil segmentation data for the second image;
- obtain a third image of the eye of the user from the camera;
- detect a set of one or more locations in the third image at which one or more glints are shown, respectively, based on the iris segmentation data generated by the machine learning model for the second image;
- identify a region of the third image at which the pupil of the eye of the user is represented based on the pupil segmentation data generated by the machine learning model for the second image; and
- determine a pose of the eye of the user based at least in part on the detected set of one or more glint locations in the third image and the identified region of the third image.

* * * * *